(12) United States Patent
Venkatesan et al.

(10) Patent No.: US 12,515,445 B2
(45) Date of Patent: Jan. 6, 2026

(54) POLYMER SHEETS FOR SEQUENCING APPLICATIONS

(71) Applicant: Illumina, Inc., San Diego, CA (US)

(72) Inventors: Bala Murali Venkatesan, San Diego, CA (US); Kenny Chen, San Diego, CA (US); Steven M. Barnard, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 1248 days.

(21) Appl. No.: 17/342,422

(22) Filed: Jun. 8, 2021

(65) Prior Publication Data

US 2021/0402749 A1 Dec. 30, 2021

Related U.S. Application Data

(63) Continuation of application No. 15/745,092, filed as application No. PCT/US2016/042041 on Jul. 13, 2016, now abandoned.

(60) Provisional application No. 62/194,061, filed on Jul. 17, 2015.

(51) Int. Cl.
| | |
|---|---|
| *B01L 3/00* | (2006.01) |
| *B01J 19/00* | (2006.01) |
| *B32B 27/30* | (2006.01) |
| *C08L 33/26* | (2006.01) |
| *C12Q 1/6837* | (2018.01) |
| *C12Q 1/6874* | (2018.01) |
| *C12Q 1/6876* | (2018.01) |
| *C08J 3/075* | (2006.01) |

(52) U.S. Cl.
CPC ......... *B32B 27/308* (2013.01); *B01J 19/0046* (2013.01); *B01L 3/505* (2013.01); *C08L 33/26* (2013.01); *C12Q 1/6837* (2013.01); *C12Q 1/6874* (2013.01); *C12Q 1/6876* (2013.01); *B01J 2219/00317* (2013.01); *B01J 2219/00621* (2013.01); *B01J 2219/00637* (2013.01); *B01J 2219/00641* (2013.01); *B01J 2219/00644* (2013.01); *B01J 2219/00722* (2013.01); *B01L 2200/0668* (2013.01); *B01L 2200/12* (2013.01); *B01L 2300/069* (2013.01); *B01L 2300/0822* (2013.01); *B01L 2300/0829* (2013.01); *B01L 2300/0893* (2013.01); *B01L 2300/0896* (2013.01); *C08J 3/075* (2013.01); *C08J 2333/26* (2013.01); *C08L 2203/02* (2013.01)

(58) Field of Classification Search
CPC ................ B01L 2300/0893; B01L 2300/0896
See application file for complete search history.

(56) References Cited

U.S. PATENT DOCUMENTS

| | | |
|---|---|---|
| 5,130,238 A | 7/1992 | Malek et al. |
| 5,429,807 A | 7/1995 | Matson et al. |
| 5,436,327 A | 7/1995 | Southern et al. |
| 5,455,166 A | 10/1995 | Walker |
| 5,561,071 A | 10/1996 | Hollenberg et al. |

(Continued)

*Primary Examiner* — Natalia Levkovich
(74) *Attorney, Agent, or Firm* — KNOBBE, MARTENS, OLSON & BEAR, LLP

(57) ABSTRACT

Embodiments of the present application relate to patterned polymer sheets and processes to prepare the same for sequencing applications. In particular, flexible micro- and nano-patterned polymer sheets are prepared and used as a template surface in sequencing reaction and new polish-free methods of forming isolated hydrogel plugs in nanowells are described.

19 Claims, 12 Drawing Sheets

Specification includes a Sequence Listing.

(56) References Cited

U.S. PATENT DOCUMENTS

| | | |
|---|---|---|
| 5,583,211 A | 12/1996 | Coassin et al. |
| 5,599,675 A | 2/1997 | Brenner |
| 5,641,658 A | 6/1997 | Adams et al. |
| 5,658,734 A | 8/1997 | Brock et al. |
| 5,750,341 A | 5/1998 | Macevicz |
| 5,837,858 A | 11/1998 | Brennan |
| 5,874,219 A | 2/1999 | Rava et al. |
| 5,919,523 A | 7/1999 | Sundberg et al. |
| 5,948,621 A | 9/1999 | Turner et al. |
| 6,136,269 A | 10/2000 | Winkler et al. |
| 6,210,891 B1 | 4/2001 | Nyren et al. |
| 6,214,587 B1 | 4/2001 | Dattagupta et al. |
| 6,258,568 B1 | 7/2001 | Nyren |
| 6,274,320 B1 | 8/2001 | Rothberg et al. |
| 6,287,768 B1 | 9/2001 | Chenchik et al. |
| 6,287,776 B1 | 9/2001 | Hefti |
| 6,288,220 B1 | 9/2001 | Kambara et al. |
| 6,291,193 B1 | 9/2001 | Khodadoust |
| 6,297,006 B1 | 10/2001 | Drmanac et al. |
| 6,346,413 B1 | 2/2002 | Fodor et al. |
| 6,355,431 B1 | 3/2002 | Chee et al. |
| 6,372,813 B1 | 4/2002 | Johnson et al. |
| 6,416,949 B1 | 7/2002 | Dower et al. |
| 6,465,178 B2 | 10/2002 | Chappa et al. |
| 6,482,591 B2 | 11/2002 | Lockhart et al. |
| 6,514,751 B2 | 2/2003 | Johann et al. |
| 6,524,793 B1 | 2/2003 | Chandler et al. |
| 6,610,482 B1 | 8/2003 | Fodor et al. |
| 6,890,741 B2 | 5/2005 | Fan et al. |
| 6,913,884 B2 | 7/2005 | Stuelpnagel et al. |
| 7,057,026 B2 | 6/2006 | Barnes et al. |
| 7,115,400 B1 | 10/2006 | Adessi et al. |
| 7,211,414 B2 | 5/2007 | Hardin et al. |
| 7,244,559 B2 | 7/2007 | Rothberg et al. |
| 7,315,019 B2 | 1/2008 | Turner et al. |
| 7,329,492 B2 | 2/2008 | Hardin et al. |
| 7,405,281 B2 | 7/2008 | Xu et al. |
| 7,582,420 B2 | 9/2009 | Oliphant et al. |
| 7,595,883 B1 | 9/2009 | El Gamal et al. |
| 7,622,294 B2 | 11/2009 | Walt et al. |
| 8,778,849 B2 | 7/2014 | Bowen et al. |
| 9,012,022 B2 | 4/2015 | George et al. |
| 2002/0055100 A1 | 5/2002 | Kawashima et al. |
| 2002/0102578 A1 | 8/2002 | Dickinson et al. |
| 2003/0113740 A1 | 6/2003 | Mirkin et al. |
| 2004/0002090 A1 | 1/2004 | Mayer et al. |
| 2004/0096853 A1 | 5/2004 | Maye et al. |
| 2005/0053980 A1 | 3/2005 | Gunderson et al. |
| 2005/0064460 A1 | 3/2005 | Holliger et al. |
| 2005/0130173 A1 | 6/2005 | Leamon et al. |
| 2005/0181440 A1 | 8/2005 | Chee et al. |
| 2005/0191698 A1 | 9/2005 | Chee et al. |
| 2006/0014003 A1 | 1/2006 | Libera et al. |
| 2007/0099208 A1 | 5/2007 | Drmanac et al. |
| 2007/0128624 A1 | 6/2007 | Gormley et al. |
| 2008/0009420 A1 | 1/2008 | Schroth et al. |
| 2008/0108082 A1 | 5/2008 | Rank et al. |
| 2009/0026082 A1 | 1/2009 | Rothberg et al. |
| 2009/0127589 A1 | 5/2009 | Rothberg et al. |
| 2009/0186349 A1 | 7/2009 | Gunderson et al. |
| 2010/0111768 A1 | 5/2010 | Banerjee et al. |
| 2010/0137143 A1 | 6/2010 | Rothberg et al. |
| 2010/0282617 A1 | 11/2010 | Rothberg et al. |
| 2011/0059865 A1 | 3/2011 | Smith et al. |
| 2011/0178285 A1 | 7/2011 | Lebl et al. |
| 2012/0270305 A1 | 10/2012 | Reed et al. |
| 2012/0316086 A1 | 12/2012 | Lin et al. |
| 2013/0116153 A1* | 5/2013 | Bowen .............. C12Q 1/6844 506/26 |
| 2014/0079923 A1 | 3/2014 | George et al. |
| 2014/0243224 A1 | 8/2014 | Barnard et al. |
| 2015/0005447 A1 | 1/2015 | Berti et al. |

* cited by examiner

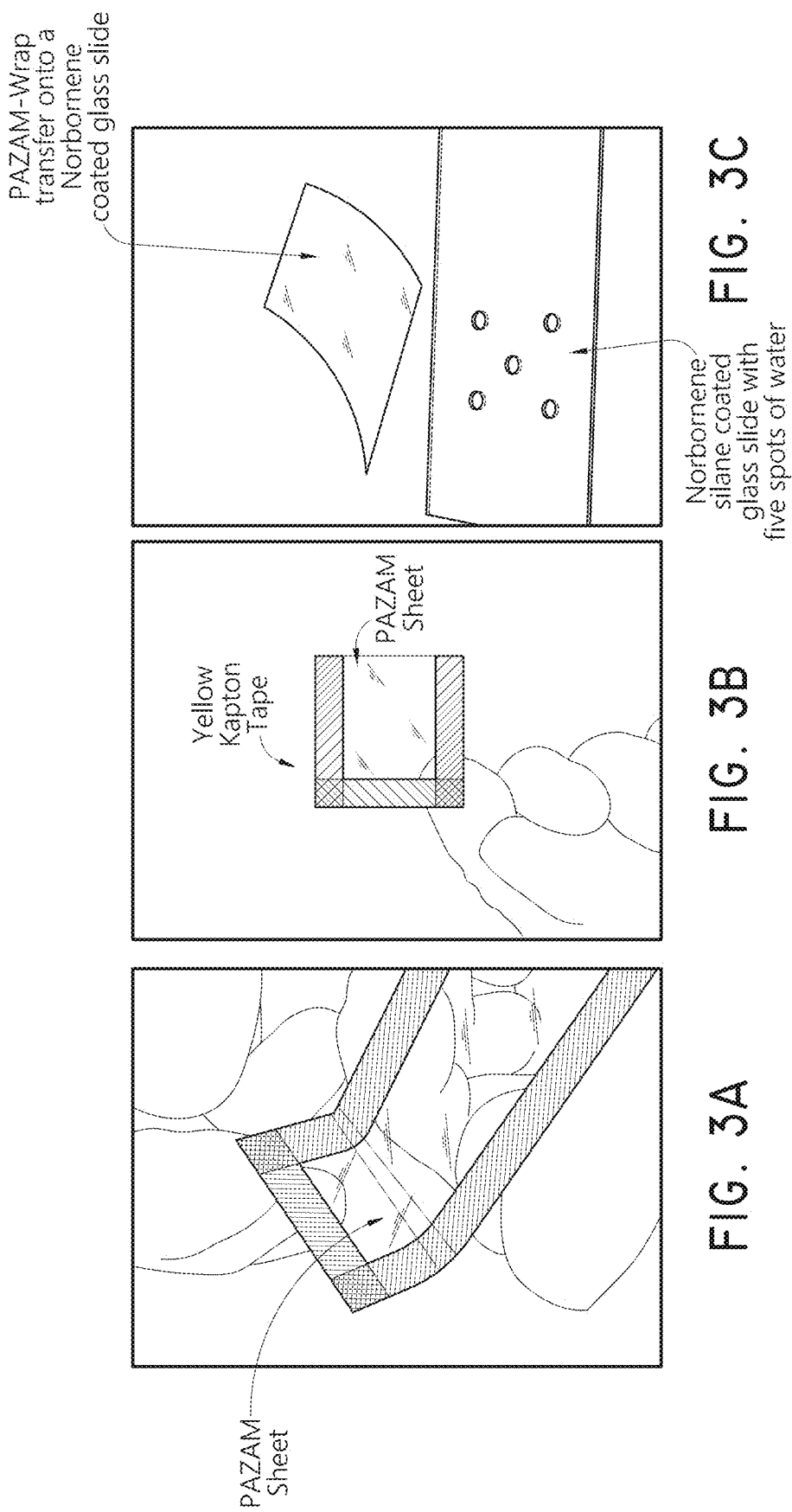

Dehydration of hydrogel on a patterned surface

POLYMER SHEETS FOR SEQUENCING APPLICATIONS

INCORPORATION BY REFERENCE TO RELATED APPLICATIONS

This application is a continuation of U.S. application Ser. No. 15/745,092, filed Jan. 15, 2018, which is a 371 of International Application No. PCT/US2016/042041, filed Jul. 13, 2016, which claims the benefit of U.S. Provisional Application No. 62/194,061, filed on Jul. 17, 2015. Each of the aforementioned applications is incorporated by reference herein in its entirety.

REFERENCE TO SEQUENCE LISTING

The present application is being filed along with a Sequence Listing in electronic format. The Sequence Listing is provided as a file entitled Sequence_Listing_ILLINC_295D1.txt, created Aug. 6, 2021, which is approximately 1.18 KB in size. The information in the electronic format of the Sequence Listing is incorporated herein by reference in its entirety.

FIELD

In general, the present application relates to the fields of polymer sheets and processes to prepare the same for polynucleotide sequencing applications.

BACKGROUND

Polymer coated substrates are used for the preparation and/or analysis of biological molecules. Molecular analyses, such as certain nucleic acid sequencing methods, rely on the attachment of nucleic acid strands to a polymer-coated surface of a substrate. The sequences of the attached nucleic acid strands can then be determined by a number of different methods that are well known in the art.

Flow cells are used in certain sequencing-by-synthesis processes. Typically, these flow cells include an active surface within an inert interstitial region. The surface of the flow cell is normally fabricated using the following steps: (1) wells are initially etched into a uniform substrate; (2) the wells and the interstitial regions are functionalized with a silane and a polymer or hydrogel; (3) excess polymer or hydrogel covering the interstitial regions is removed via a polishing process; (4) the polymer or hydrogel in the wells is then grafted with single stranded primer DNA to provide a flow cell surface for the downstream sequencing application. In this case, some of the polymer or hydrogel is wasted in the polishing step of the fabrication workflow.

SUMMARY

Some embodiments described herein are related to processes of preparing a polymer sheet for nucleic acid sequencing applications, comprising providing a substrate with a surface; depositing a layer of a polymer composition onto the surface of the substrate, wherein the polymer composition includes functional groups for grafting oligonucleotides; forming the polymer composition into a polymer sheet on the surface; and removing the excess polymer sheet material from the surface of the substrate. In some embodiments, the forming of the polymer sheet comprises dehydrating the polymer composition.

Some embodiments described herein are related to polymer sheets for nucleic acid sequencing applications prepared by the processes described herein.

Some embodiments described herein are related to a process of preparing a substrate surface for nucleic acid sequencing applications, comprising providing a polymer sheet having a first plurality of functional groups; contacting the polymer sheet with a surface of a substrate, wherein the surface includes a second plurality of functional groups; covalently bonding the first plurality of functional groups of the polymer sheet to the second plurality of functional groups of the surface. In some embodiments, the polymer sheet is patterned. In some such embodiments, the polymer sheet includes a plurality of micro-scale or nano-scale patterned channels, trenches, posts, wells, or combinations thereof.

Some embodiments described herein are related to a process of preparing a patterned substrate surface for nucleic acid sequencing applications, comprising: providing a substrate with a patterned surface, wherein the surface includes a plurality of micro-scale or nano-scale patterned wells; depositing a polymer composition onto the patterned surface to form a first polymer layer, wherein the polymer composition fills the micro-scale or nano-scale patterned wells; and separating the first polymer layer, wherein the polymer composition is isolated in the micro-scale or nano-scale patterned wells of the patterned surface. In some embodiments, the process further includes dehydrating the first polymer layer prior to the separating of the first polymer layer. In some embodiments, the processes further includes laminating a second polymer layer directly on top of the patterned surface after separating the first polymer layer. In some such embodiments, the processes further includes separating the second polymer layer from the patterned surface, wherein the polymer composition is removed from the micro-scale or nano-scale patterned wells of the patterned surface to form a plurality of patterned polymer posts on the second polymer layer. In some embodiments, the second polymer layer is stretchable.

Some embodiments described herein are related to a substrate surface for nucleic acid sequencing applications prepared by the processes described herein.

Some further embodiments described herein are related to an automated roll-to-roll process for nucleic acid sequencing applications, comprising: spooling a roll of a patterned polymer sheet prepared by the process described herein; preparing the patterned polymer sheet for sequencing by treating the polymer sheet with sequencing reagents; sequencing a sample on the treated patterned polymer sheet; and respooling the patterned stretchable polymer sheet after the completion of one sequencing cycle. In some embodiments, the patterned polymer sheet is stretchable.

Some additional embodiments described herein are related to an automated process for nucleic acid sequencing applications, comprising: providing a belt comprising the patterned polymer sheet prepared by the process described herein; preparing the patterned polymer sheet for sequencing by treating the polymer sheet with sequencing reagents from a fluid delivery device; and sequencing a sample on the treated patterned polymer sheet, wherein the belt passes the fluid delivery device for each cycle of the sequencing application.

Although the present disclosure exemplifies methods and compositions in the context of nucleic acid sequencing applications, it will be understood that other uses and applications are possible. Exemplary applications include, but are not limited to, non-sequencing based nucleic acid assays, such as hybridization or binding assays; protein assays, such as binding or kinetic assays; cell assays; assays for other biological components; assays for non-biological components (whether biologically active or biologically inert); or the like. Accordingly, any of a variety of analytes useful in these assays or other assays known in the art can be attached to a polymer sheet and/or a surface as exemplified herein for analytes used in nucleic acid sequencing applications. As a further application, the methods of compositions set forth herein can be used for the synthesis of various analytes, including but not limited to, nucleic acids, proteins, biologically active molecules, biologically inert molecules, and candidate therapeutic agents or the like.

BRIEF DESCRIPTION OF THE DRAWINGS

FIG. 3A illustrates delaminating a PAZAM sheet formed according to the process illustrated in FIG. 2.

FIG. 3B illustrates the suspension of a PAZAM sheet in yellow Kapton® tape.

FIG. 3C illustrates the transfer of a PAZAM sheet onto a functionalized carrier substrate, for example, a norbornene coated glass slide.

DETAILED DESCRIPTION OF THE EMBODIMENTS

Figure 1A:
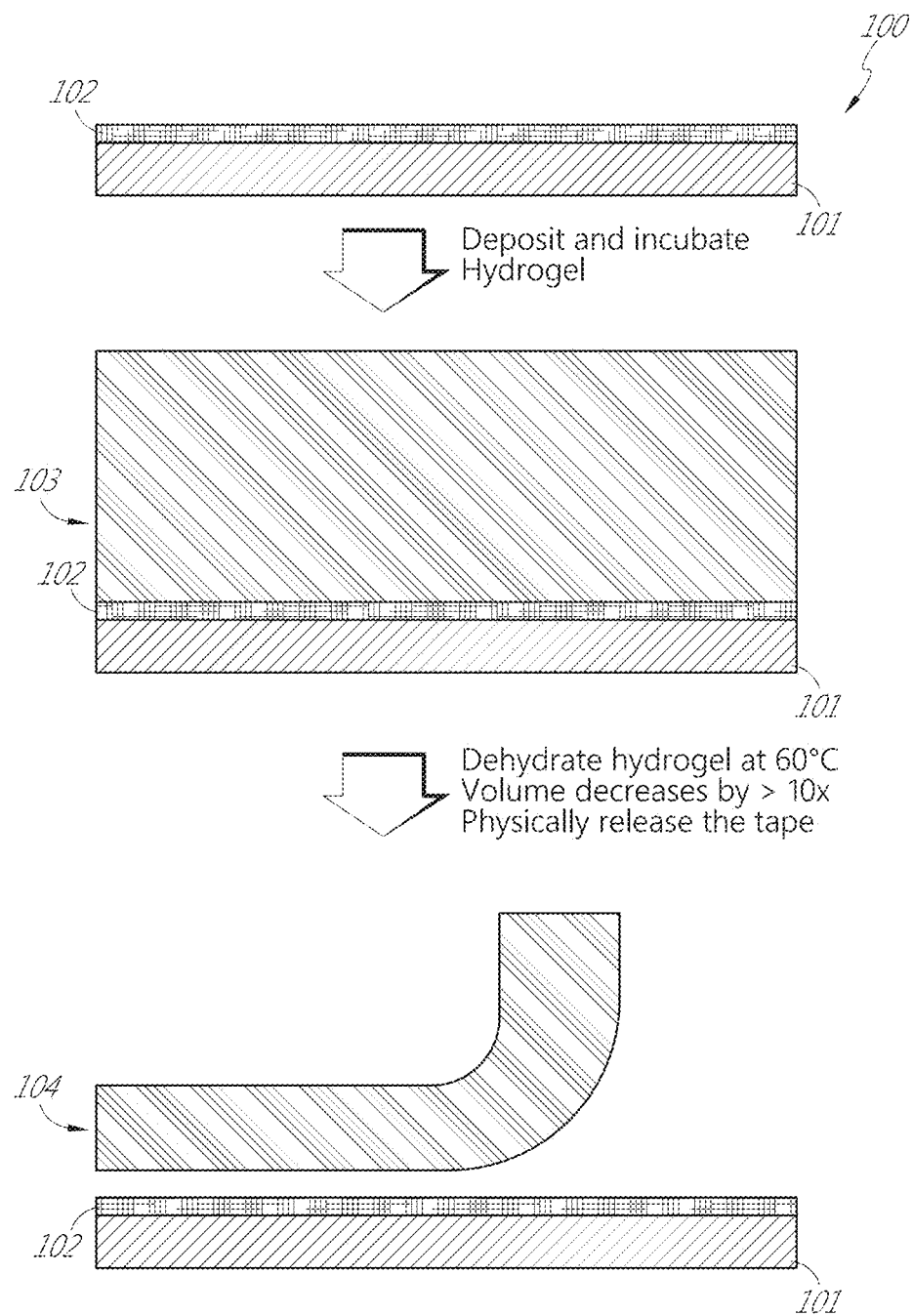
FIG. 1A illustrates a cross-sectional view of a process for preparing an unpatterned polymer sheet.

Described herein are processes to form polymer sheets. In some embodiments, the polymer sheets can be used for nucleic acid sequencing reactions. In some embodiments, the polymer sheets have smooth surfaces, while in other embodiments, the polymer sheets are micro or nano-patterned polymer sheets. Some embodiments described herein are related to direct patterning and release of a free-standing, flexible polymer sheet for optional use as a template surface in nucleic acid sequencing reactions or other applications. Some other embodiments described herein are related to polish-free method to form "gels in wells" referring to patterned hydrogel isolated in nanowells of the substrate surface. These processes may be used in a variety of applications, including next generation nucleic acid sequencing, stem cell growth, differentiation and proliferation on patterned biocompatible surfaces and stretchable, and bioreactions and integration with biosensors on flexible and/or stretchable electronics and stretchable surfaces for plasmonics.

In some instances, the polymer sheet is freely suspended and has the consistency and flexibility of well-known plastic wrap material used for storage of food and other household items, however also providing the chemical reactivity present in a typical hydrogel coating for nucleotide sequencing. For example, in a standard flow cell for sequencing, active functional groups are generally present on the coating that can partake in primer grafting. This can be seen in the ILLUMINA® (San Diego, Calif.) sequencing by synthesis systems. As a result, this flexible polymer sheet could be applied to a variety of sequencing architectures, including flowcells, through lamination or transfer printing processes.

Some further embodiments described herein relate to the use of flexible polymer sheets for factory-scale sequencing, for example, in a roll-to roll format analogous to a printing press where the flexible polymer sheets are repeatedly respooled back and forth through the system during each cycle of sequencing. Similarly the flexible polymer sheets can be formed into belts that repeatedly pass the surface through a system for respective cycles of sequencing. This approach could enable low-cost, high throughput sequencing reactions to take place.

Optionally, the polymer sheets can be stretchable. In such embodiments, the stretchable polymer sheets contain high density hydrogel arrays that could then be stretched or deformed across a low numerical aperture (NA) read-head for sequencing using low cost optic imaging devices. This approach combines the lower input and reagent volumes afforded by smaller flowcell sizes with the low cost optics. More specifically, the surface can be in a relatively contracted state during fluid processing steps to allow a large number of array features to contact a relatively low volume of reagents. Following the chemistry step, and the surface can be stretched to increase the pitch of the array, thereby enabling the optical detection and delineation of adjacent features using a low numerical aperture objective that would typically not be able to resolve these features in a contracted state. In addition, stretching the surface to increase the pitch of the features reduces cross-talk between array features during detection steps, enabling robust imaging using low-cost optics.

In some other embodiments of the stretchable polymers, these stretchable polymer sheets can be coated or patterned with metals or dielectrics. By thermally, mechanically, chemically or optically stressing these shape memory polymer sheets with patterned metallic structures on the polymer can be tuned to contract, thereby forming metallic or dielectric surfaces with a reduced pitch to the non-stressed state. In addition, the shrinking process will induce higher surface roughness or "wrinkles" in the metal structures. See, Fu et al., "Tunable Nanowrinkles on Shape Memory Polymer Sheets," *Adv. Mater.* 2009, 21, 1-5. Potential applications for these contracted polymer materials with patterned metals and dielectrics are in plasmonics, SERS, fluorescence enhancement, electronics among other applications. Nylons and polyolefins are examples of heat shrink polymers that can be coated with polymers for sequencing or patterned with metals/dielectrics and shrunk for use in plasmonics, electronics and for the formation of metallic or semiconductor gap junctions. Other families of candidate polymers that could be used for these applications include polyolefins, polyvinyls, polycarbonates, polyurethanes, silicones, Kapton® polyimide films amongst others.

The following detailed description is directed to certain specific embodiments of the present application. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment can be included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The section headings used herein are for organizational purposes only and are not to be construed as limiting the subject matter described.

Definitions

Unless defined otherwise, all technical and scientific terms used herein have the same meaning as is commonly understood by one of ordinary skill in the art. All patents, applications, published applications and other publications referenced herein are incorporated by reference in their entirety unless stated otherwise. As used in the specification and the appended claims, the singular forms "a," "an" and "the" include plural referents unless the context clearly dictates otherwise. The use of "or" means "and/or" unless stated otherwise. Furthermore, use of the term "including" as well as other forms, such as "include", "includes," and "included," is not limiting. As used in this specification, whether in a transitional phrase or in the body of the claim, the terms "comprise(s)" and "comprising" are to be interpreted as having an open-ended meaning. That is, the terms are to be interpreted synonymously with the phrases "having at least" or "including at least." When used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

As used herein, common organic abbreviations are defined as follows:
dATP Deoxyadenosine triphosphate
dCTP Deoxycytidine triphosphate
dGTP Deoxyguanosine triphosphate
dTTP Deoxythymidine triphosphate
ssDNA Single stranded DNA
NA Numerical aperture
SBS Sequencing by synthesis
PAZAM poly(N-(5-azidoacetamidylpentyl) acrylamide-co-acrylamide) of any acrylamide to Azapa (N-(5-(2-azido-acetamido)pentyl)acrylamide) ratio
° C. Temperature in degrees Centigrade
μm micrometer As used herein, the term "array" refers to a population of different features that occur on one or more substrates such that the different features can be spatially differentiated from each other. In some embodiments, the features are wells, posts, trenches, ridges or other contours on a substrate surface. Alternatively or additionally, the features can each comprise one or more probe molecules and optionally different probes can be present at each of the features. A feature can also be defined as a location where a gel or other material resides in larger quantity than an interstitial region on the same surface. An array can include different probe molecules that are each located at a different addressable location on a substrate. Alternatively or additionally, an array can include separate substrates each bearing a different probe molecule, wherein the different probe molecules can be identified according to the locations of the substrates on a surface to which the substrates are attached or according to the locations of the substrates in a liquid. Exemplary arrays in which separate substrates are located on a surface include, without limitation, those including beads in wells as described, for example, in U.S. Pat. No. 6,355,431 B1, U.S. 2002/0102578 and PCT Publication No. WO 00/63437. Exemplary formats that can be used in the present application to distinguish beads in a liquid array, for example, using a microfluidic device, such as a fluorescent activated cell sorter (FACS), are described, for example, in U.S. Pat. No. 6,524,793. Further examples of arrays that can be used in the application include, without limitation, those described in U.S. Pat. Nos. 5,429,807; 5,436,327; 5,561,071; 5,583,211; 5,658,734; 5,837,858; 5,874,219; 5,919,523; 6,136,269; 6,287,768; 6,287,776; 6,288,220; 6,297,006; 6,291,193; 6,346,413; 6,416,949; 6,482,591; 6,514,751 and 6,610,482; and WO 93/17126; WO 95/11995; WO 95/35505; EP 742 287; and EP 799 897.

As used herein, the term "covalently attached" or "covalently bonded" refers to the forming of a chemical bonding that is characterized by the sharing of pairs of electrons between atoms. For example, a "covalently attached polymer sheet," when used in reference to a substrate surface, refers to a polymer sheet that forms chemical bonds with a functionalized surface of a substrate, as compared to attachment to the surface via other means, for example, adhesion or electrostatic interaction. It will be appreciated that polymers that are attached covalently to a surface can also be bonded via other means in addition to covalent attachment.

As used herein, the term "roll to roll process" refers to manipulation of an elongated substrate as it is transferred from one spool to another. An exemplary roll to roll process is continuous sequencing of a patterned substrate surface as the surface moves past a sequencing device while being unspooled from one roll and spooled onto another roll.

As used herein, the term "pitch" refers to the center-to-center spacing between two features of an array. A pattern of features can be characterized in terms of the average pitch. For example, the pattern can be regular such that the coefficient of variation around the average pitch is small or the pattern can be non-regular in which case the coefficient of variation can be relatively large. In either case, the average pitch can be, for example, at least about 10 nm, about 0.1 µm, about 0.5 µm, about 1 µm, about 5 µm, about 10 µm, about 100 µm or more, or a range defined by any of the two preceding values. Alternatively or additionally, the average pitch can be, for example, at most about 100 µm, about 10 µm, about 5 µm, about 1 µm, about 0.5 µm, about 0.1 µm or less, or a range defined by any of the two preceding values.

As used herein, the term "cross-talk" refers to signal apparent from an observed feature due to signal produced from another feature. Cross-talk is generally undesirable and generally considered to be a form of background.

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

The term "halogen" or "halo," as used herein, means any one of the radio-stable atoms of column 7 of the Periodic Table of the Elements, e.g., fluorine, chlorine, bromine, or iodine, with fluorine and chlorine being preferred.

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group may be designated as "$C_{1-4}$ alkyl" or similar designations. By way of example only, "$C_{1-4}$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkene" or "alkenyl" refers to a straight or branched hydrocarbon chain containing one or more double bonds. The alkenyl group may have 2 to 20 carbon atoms, although the present definition also covers the occurrence of the term "alkenyl" where no numerical range is designated. The alkenyl group may also be a medium size alkenyl having 2 to 9 carbon atoms. The alkenyl group could also be a lower alkenyl having 2 to 4 carbon atoms. The alkenyl group may be designated as "$C_{2-4}$ alkenyl" or similar designations. By way of example only, "$C_{2-4}$ alkenyl" indicates that there are two to four carbon atoms in the alkenyl chain, i.e., the alkenyl chain is selected from the group consisting of ethenyl, propen-1-yl, propen-2-yl, propen-3-yl, buten-1-yl, buten-2-yl, buten-3-yl, buten-4-yl, 1-methyl-propen-1-yl, 2-methyl-propen-1-yl, 1-ethyl-ethen-1-yl, 2-methyl-propen-3-yl, buta-1,3-dienyl, buta-1,2,-dienyl, and buta-1,2-dien-4-yl. Typical alkenyl groups include, but are in no way limited to, ethenyl, propenyl, butenyl, pentenyl, and hexenyl, and the like.

As used herein, "alkynyl" refers to a straight or branched hydrocarbon chain containing one or more triple bonds. The alkynyl group may have 2 to 20 carbon atoms, although the present definition also covers the occurrence of the term "alkynyl" where no numerical range is designated. The alkynyl group may also be a medium size alkynyl having 2 to 9 carbon atoms. The alkynyl group could also be a lower alkynyl having 2 to 4 carbon atoms. The alkynyl group may be designated as "$C_{2-4}$ alkynyl" or similar designations. By way of example only, "$C_{2-4}$ alkynyl" indicates that there are two to four carbon atoms in the alkynyl chain, i.e., the alkynyl chain is selected from the group consisting of ethynyl, propyn-1-yl, propyn-2-yl, butyn-1-yl, butyn-3-yl, butyn-4-yl, and 2-butynyl. Typical alkynyl groups include, but are in no way limited to, ethynyl, propynyl, butynyl, pentynyl, and hexynyl, and the like.

As used herein, "cycloalkyl" means a fully saturated carbocyclyl ring or ring system. Examples include cyclohexyl, cycloheptyl, cyclooctyl, etc.

As used herein, "cycloalkylene" means a fully saturated carbocyclyl ring or ring system that is attached to the rest of the molecule via two points of attachment.

As used herein, "cycloalkenyl" or "cycloalkene" means a carbocyclyl ring or ring system having at least one double bond, wherein no ring in the ring system is aromatic. An example is cyclooctene. Another example is norbornene or norbornenyl.

As used herein, "heterocycloalkenyl" or "heterocycloalkene" means a carbocyclyl ring or ring system with at least one heteroatom in ring backbone, having at least one double bond, wherein no ring in the ring system is aromatic.

As used herein, "cycloalkynyl" or "cycloalkyne" means a carbocyclyl ring or ring system having at least one triple bond, wherein no ring in the ring system is aromatic. An example is cyclooctyne. Another example is bicyclononyne.

As used herein, "heterocycloalkynyl" or "heterocycloalkyne" means a carbocyclyl ring or ring system with at least one heteroatom in ring backbone, having at least one triple bond, wherein no ring in the ring system is aromatic.

An "amino" group refers to a "—$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes free amino (i.e., —$NH_2$).

A "C-amido" group refers to a "—C(=O)$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-amido" group refers to a "—N($R_A$)C(=O)$R_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

As used herein, the term "carboxylic acid" or "carboxyl" as used herein refers to —C(O)OH.

The term "hydrazine" or "hydrazinyl" as used herein refers to a —$NHNH_2$ group.

As used herein, the term "hydrazone" or "hydrazonyl" as used herein refers to a

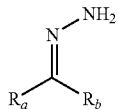

group in which $R_a$ and $R_b$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes free amino (i.e., —NH$_2$).

The term "epoxy" as used herein refers to

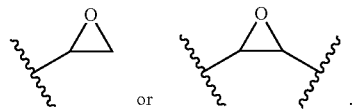

The term "glycidyl ether" as used herein refers to

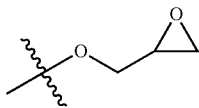

As used herein, the term "tetrazine" or "tetrazinyl" refers to six-membered heteroaryl group comprising four nitrogen atoms. Tetrazine may be optionally substituted.

As used herein, the term "tetrazole" or "tetrazolyl" refers to five membered heterocyclic group comprising four nitrogen atoms. Tetrazole may be optionally substituted.

An "nitrile oxide" as used herein, refers to a "RC≡N$^+$O$^-$" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, or 5-10 membered heterocyclyl, as defined herein. Non-limiting examples of preparing nitrile oxide include in situ generation from aldoximes by treatment with chloramide-T or through action of base on imidoyl chlorides [RC(Cl)=NOH].

An "nitrone" as used herein, refers to a "$R_A R_B C$=$NR_c$$\pm^+$ O$^-$" group in which $R_A$, $R_B$ and $R_c$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, or 5-10 membered heterocyclyl, as defined herein.

As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_6$ alkyl, $C_1$-$C_6$ alkenyl, $C_1$-$C_6$ alkynyl, $C_1$-$C_6$ heteroalkyl, $C_3$-$C_7$ carbocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), $C_3$-$C_7$-carbocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl($C_1$-$C_6$)alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl($C_1$-$C_6$) alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), halo, cyano, hydroxy, $C_1$-$C_6$ alkoxy, $C_1$-$C_6$ alkoxy($C_1$-$C_6$)alkyl (i.e., ether), aryloxy, sulfhydryl (mercapto), halo($C_1$-$C_6$) alkyl (e.g., —CF$_3$), halo($C_1$-$C_6$)alkoxy (e.g., —OCF$_3$), $C_1$-$C_6$ alkylthio, arylthio, amino, amino($C_1$-$C_6$)alkyl, nitro, O-carbamyl, N-carbamyl, O-thiocarbamyl, N-thiocarbamyl, C-amido, N-amido, S-sulfonamido, N-sulfonamido, C-carboxy, O-carboxy, acyl, cyanato, isocyanato, thiocyanato, isothiocyanato, sulfinyl, sulfonyl, and oxo (=O). Wherever a group is described as "optionally substituted" that group can be substituted with the above substituents.

As used herein, a "nucleotide" includes a nitrogen containing heterocyclic base, a sugar, and one or more phosphate groups. They are monomeric units of a nucleic acid sequence. In RNA, the sugar is a ribose, and in DNA a deoxyribose, i.e. a sugar lacking a hydroxyl group that is present at the 2' position in ribose. The nitrogen containing heterocyclic base can be purine or pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine.

As used herein, a "nucleoside" is structurally similar to a nucleotide, but lacks any phosphate moieties at the 5' position. The term "nucleoside" is used herein in its ordinary sense as understood by those skilled in the art. Examples include, but are not limited to, a ribonucleoside comprising a ribose moiety and a deoxyribonucleoside comprising a deoxyribose moiety. A modified pentose moiety is a pentose moiety in which an oxygen atom has been replaced with a carbon and/or a carbon has been replaced with a sulfur or an oxygen atom. A "nucleoside" is a monomer that can have a substituted base and/or sugar moiety. Additionally, a nucleoside can be incorporated into larger DNA and/or RNA polymers and oligomers.

As used herein, the term "polynucleotide" refers to nucleic acids in general, including DNA (e.g. genomic DNA cDNA), RNA (e.g. mRNA), synthetic oligonucleotides and synthetic nucleic acid analogs. Polynucleotides may include natural or non-natural bases, or combinations thereof and natural or non-natural backbone linkages, e.g. phosphorothioates, PNA or 2'-O-methyl-RNA, or combinations thereof.

As used herein, the term "primer" is defined as a single strand DNA (ssDNA) molecule with a free 3' OH group and a modification at the 5' terminus to allow the coupling reactions. The primer length can be any number of bases long and can include a variety of non-natural nucleotides. In some embodiments, "SBS primers" are used as part of a sequencing by synthesis (SBS) reaction on a system such as the HiSeq®, MiSeq® or NextSeq® systems from Illumina (San Diego, Calif.). In these reactions, a set of amplification primers are typically bound to a glass surface. A set of target DNA molecules to be sequenced is hybridized to the bound primers and then amplified by a bridge amplification process. The sequencing reactions are carried out, and in embodiments of the invention, the amplification primers (and amplicons including primers extended during amplification steps to include copies of the target DNA) are then unbound from the glass surface so that the surface is reusable in future sequencing reactions. Thus, one or more of the steps of attaching amplification primers to the glass surface, hybridizing target DNA molecules to the primers, bridge amplification, sequencing the target DNA, and removing amplification primers and amplicons can be repeated. One or more repetition can be carried out. In some embodiments, the SBS primers can be the P5 or P7 primers in one embodiment, as detailed below. The P5 and P7 primers are used on the surface of commercial flow cells sold by Illumina Inc. for sequencing on the HiSeq®, MiSeq®, NextSeq® and Genome Analyzer® platforms. The primer sequences are described in U.S. Pat. Pub. No. 2011/0059865 A1, which is incorporated herein by reference in its entirety.

The P5 and P7 primer sequences comprise the following:

```
Paired end set:
P5: paired end 5'→3'
                                    (SEQ ID NO: 1)
AATGATACGGCGACCACCGAGAUCTACAC P7: paired end 5'→3'
                                    (SEQ ID NO: 2)
CAAGCAGAAGACGGCATACGAG*AT Single read set:
P5: single read: 5'→3'
                                    (SEQ ID NO: 3)
AATGATACGGCGACCACCGA P7: single read 5'→3'
                                    (SEQ ID NO: 4)
CAAGCAGAAGACGGCATACGA
```

Optionally, one or both of the P5 and P7 primers can include a poly T tail. The poly T tail is generally located at the 5' end of the above sequences, but in some cases can be located at the 3' end. The poly T sequence can include any number of T nucleotides, for example, from 2 to 20.

Processes for Preparation of Polymer Sheets for Sequencing Applications

Some embodiments described herein are related to processes of preparing a polymer sheet for sequencing applications, include providing a substrate with a surface; depositing a layer of a polymer composition onto the surface of the substrate, wherein the polymer composition comprises functional groups for grafting oligonucleotides; forming the polymer composition into a polymer sheet on the surface; and removing the polymer sheet from the surface of the substrate.

Various polymers compositions can be used in the processes described herein. The polymer compositions can include a polymer with one or more functional groups that are capable of reacting with biomolecules of interest, for example, for grafting primers. In some embodiments, the functional groups of the polymer are also capable of reacting with the substrate surface to form covalent bonding between the polymer and the substrate surface. In these instances, the substrate surface is usually treated with functional silane or silane derivatives, which provide reactive sites on the surface for reaction with the polymer composition. In some such embodiments, the functional groups of the polymer composition may include or may be selected from $C_{8-14}$ cycloalkenes, 8 to 14 membered heterocycloalkenes, $C_{8-14}$ cycloalkynes, 8 to 14 membered heterocycloalkynes, alkynyl, vinyl, halo, azido, amino, amido, epoxy, glycidyl, carboxyl, hydrazonyl, hydrazinyl, hydroxy, tetrazolyl, tetrazinyl, nitrile oxide, nitrene, nitrone, oxo-amino, or thiol, or optionally substituted variants and combinations thereof. Non-limiting examples of the polymers can be used in the present application are described herein, including those described in U.S. Pat. No. 9,012,022, which is hereby incorporated by reference in its entirety.

In some instances, the polymer composition may be partially or completely replaced by monomer composition, a pre-polymer composition or a polymer precursor composition, wherein polymerization reaction is carried out in situ during the forming of the polymer sheet.

Hydrogels

In some embodiments, the polymer composition described herein comprises a hydrogel. Non-limiting exemplary hydrogels that can be used in the present application include polyacrylamide, polymethacrylic acids, homopolymer hydrogels, copolymer hydrogels, multipolymer hydrogels, etc. Other non-limiting examples of hydrogels that can be used in the present application are described herein. WO 00/31148 (incorporated herein by reference) discloses polyacrylamide hydrogels and polyacrylamide hydrogel-based arrays in which a so-called polyacrylamide prepolymer is formed, preferably from acrylamide and an acrylic acid or an acrylic acid derivative containing a vinyl group. Crosslinking of the prepolymer may then be carried out. The hydrogels so produced are solid-supported, preferably on glass. Functionalization of the solid-supported hydrogel may also be carried out.

WO 01/01143 (incorporated herein by reference) describes technology similar to WO00/31148 but differing in that the hydrogel bears functionality capable of participating in a [2+2] photocycloaddition reaction with a biomolecule so as to form immobilized arrays of such biomolecules. Such functionalized hydrogels can be used in a method of composition of the present disclosure. Dimethylmaleimide (DMI) is a particularly preferred functionality. The use of [2+2] photocycloaddition reactions, in the context of polyacrylamide-based microarray technology is also described in WO02/12566 and WO03/014392 (both being incorporated herein by reference).

U.S. Pat. No. 6,465,178 (incorporated herein by reference) discloses the use of reagent compositions in providing activated slides for use in preparing microarrays of nucleic acids; the reagent compositions include acrylamide copolymers. The compositions and methods set forth therein can be applied in the context of the methods and compositions set forth herein.

WO 00/53812 (incorporated herein by reference) discloses the preparation of polyacrylamide-based hydrogel arrays of DNA and the use of these arrays in replica amplification which can be used in a method or composition set forth herein.

Once hydrogels have been formed, biomolecules may then be attached to them so as to produce molecular arrays, if desired. Attachment can be effected in different ways. For example, U.S. Pat. No. 6,372,813 (incorporated herein by reference) teaches immobilization of polynucleotides bearing dimethylmaleimide groups to the hydrogels produced which bear dimethylmaleimide groups by conducting a [2+2] photocycloaddition step between two dimethylmaleimide groups—one attached to the polynucleotide to be immobilized and one pendant from the hydrogel.

Where the molecular array is formed after generation of the hydrogel, two strategies can be employed to achieve this end. Firstly, the hydrogel may be modified chemically after it is produced. A more common alternative is to effect polymerization with a co-monomer having a functionality primed or pre-activated to react with the molecules to be arrayed.

Alternatives to initial formation of hydrogels followed by subsequent arraying of molecules thereto can be employed, for example, where the array is formed at the same time as the hydrogel is produced. This may be effected by, for example, direct copolymerization of acrylamide-derivatized polynucleotides. An example of this approach is described in WO01/62982 (incorporated herein by reference) in which acrylamide-derivatized polynucleotides are mixed with solutions, of acrylamide and polymerization is effected directly.

Mosaic Technologies (Boston, Mass., USA) produced ACRYDITE™ (an acrylamide phosphoramidite) which can be reacted with polynucleotides prior to copolymerization of the resultant monomer with acrylamide.

Efimov et al. (Nucleic Acids Research, 1999, 27 (22), 4416-4426, incorporated herein by reference) disclose a further example of a simultaneous formation of hydrogel/array that can be used, in which copolymerization of acrylamide, reactive acrylic acid derivatives and the modified polynucleotides having 5'- or 3'-terminal acrylamide groups occurs.

PAZAM

In some embodiments, the polymer composition comprises poly(N-(5-azidoacetamidylpentyl) acrylamide-co-acrylamide) (PAZAM). In some embodiments, PAZAM is also represented by Formula (A) or (B):

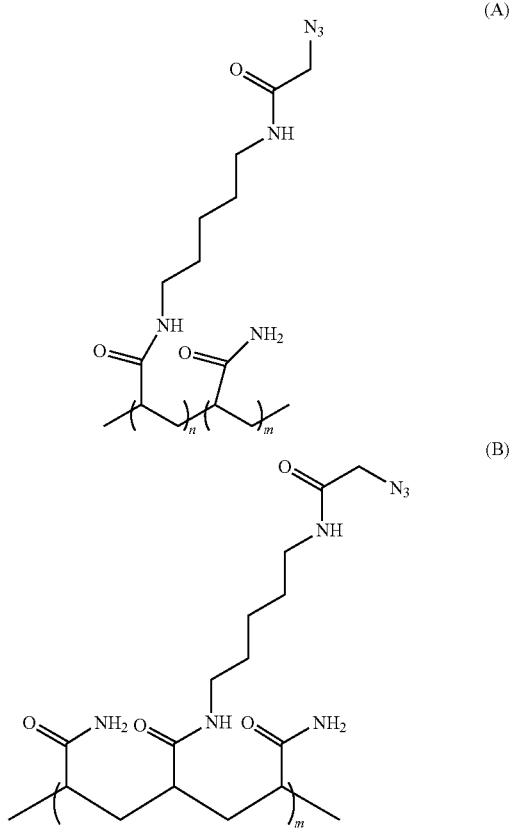

wherein n is an integer in the range of 1-20,000, and m is an integer in the range of 1-100,000.

PAZAM can be prepared by polymerization of acrylamide and Azapa (N-(5-(2-azidoacetamido)pentyl)acrylamide) in any ratio. In some embodiments, PAZAM is a linear polymer. In some other embodiments, PAZAM is a lightly cross-linked polymer. In some embodiments, PAZAM is applied as an aqueous solution. In some other embodiments, PAZAM is applied as an aqueous solution with one or more solvent additives, such as ethanol. The method for preparation different PAZAM polymers is discussed in details in U.S. Pat. No. 9,012,022, which is hereby incorporated by reference in its entirety. In some embodiments, PAZAM may be mixed with one or more polymers or hydrogels in the preparation of the polymer composition described herein.

In some embodiments, the surface of the substrate is treated with a silane or silane derivative before depositing the polymer composition (or precursors of the polymer). In one embodiment, the surface of the substrate is treated with fluorosilane. In another embodiment, the surface is treated with a norbornene silane, for example, [(5-bicyclo[2.2.1]hept-2-enyl)ethyl]trimethoxysilane. Other suitable silane derivatives that can be used in the present application are described in U.S. Pub. No. 2015/0005447 A1, which is hereby incorporated by reference in its entirety.

In some embodiments, the forming of the polymer sheet comprises dehydrating the polymer composition. One purpose of the dehydrating step is to remove any solvent in the polymer composition. In some embodiments, the dehydrating step is performed at an elevated temperature, for example, above about 30° C., or at a temperature that is compatible with the functional moieties in the polymer or hydrogel. In some such embodiments, the dehydrating occurs at about 60° C. In some cases, the dehydrating temperature is controlled to maintain the desired chemical and physical properties of the polymer sheets, such as below about 100° C. For example, the dehydrating temperature is usually below about 90° C. when PAZAM is used. The dehydrating step can be performed in various devices known to one of ordinary skill in the art, for example, a hot plate or a vacuum oven. In some embodiments, a separate step of incubating the polymer composition on the surface may be needed if the formed polymer sheet is to be chemically linked or bonded to the surface.

In some embodiments, the surface of the substrate includes micro-scale or nano-scale patterns, such as channels, trenches, posts, wells, or combinations thereof. In some such embodiments, an imprint of the micro-scale or nano-scale patterns of the patterned surface is transferred to the polymer sheet to form a patterned polymer sheet. Micro-scale patterns include, for example, those having features with dimensions (e.g. average diameter or average cross section) in the range of about 1 micron to about 999 microns. Nano-scale patterns include, for example, those having features with dimensions (e.g. average diameter or average cross section) in the range of about 1 nanometer to about 999 nanometers.

Some embodiments described herein are related to polymer sheets for sequencing applications prepared by the processes described herein and substrates comprising polymer sheets prepared by the processes described herein for sequencing applications.

FIG. 1A illustrates the cross-sectional view of a process for preparing an unpatterned polymer sheet according to some embodiments of the present application. First, a substrate 100 containing an underlying glass plate 101 and a fluorosilane layer 102 surface is provided. Then, a layer of hydrated hydrogel 103 is deposited on top of the fluorosilane layer 102. Following dehydration of the hydrogel at 60° C., the hydrogel forms a polymer sheet 104, which is subsequently removed by physical force, such as a tape.

Figure 1B:
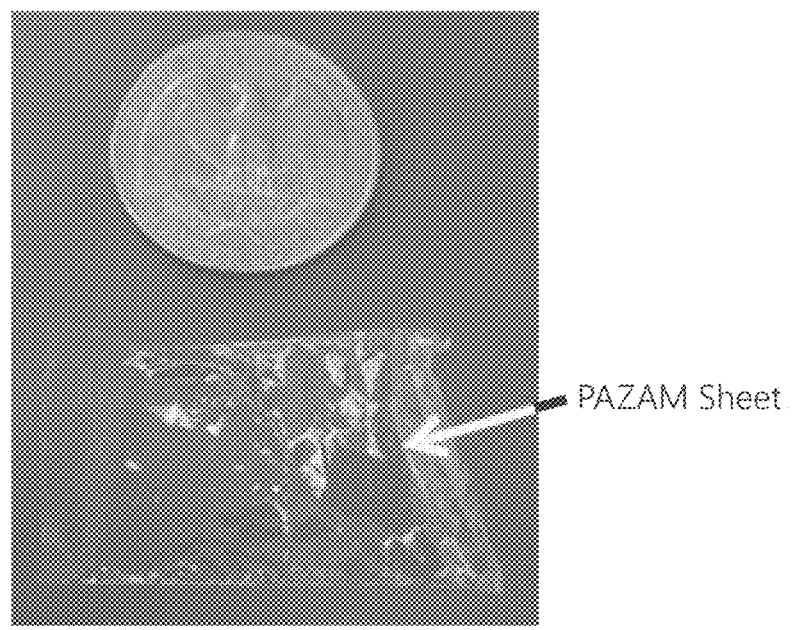
FIG. 1B is a top view of a sheet of PAZAM hydrogel prepared by the process illustrated in FIG. 1A.
Figure 1C:
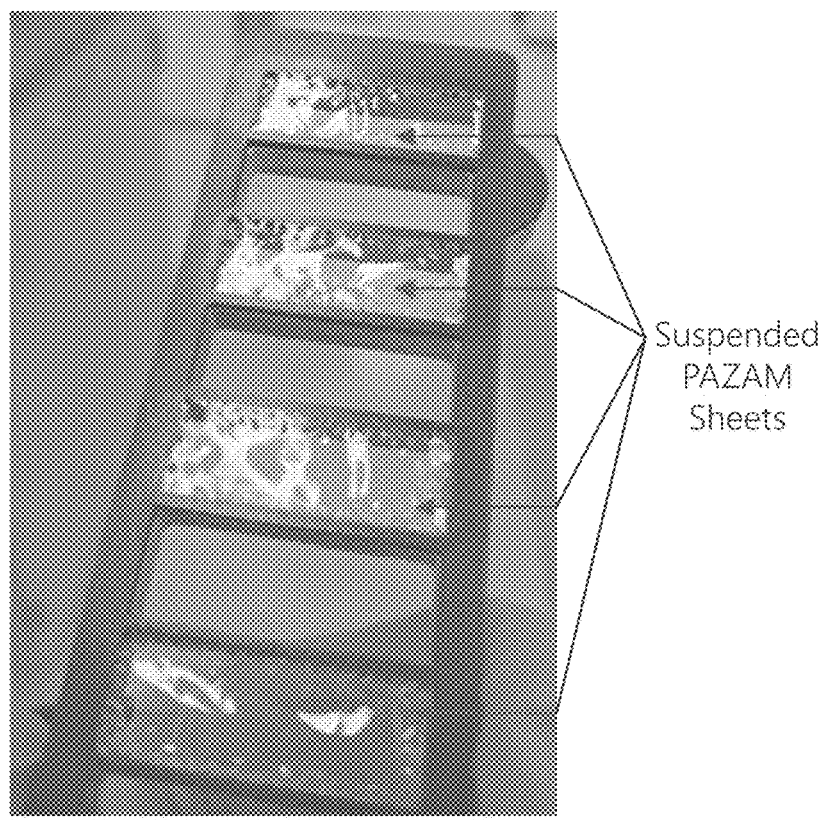
FIG. 1C is a top view of the PAZAM sheets prepared by the process illustrated in FIG. 1A, where the sheets are suspended on a plastic supporting rack to form a free standing polymer membrane.

FIG. 1B is a top view of a sheet of PAZAM prepared by the process illustrated in FIG. 1A. FIG. 1C is a top view of the PAZAM sheets prepared by the process illustrated in FIG. 1A, where the sheets are suspended on a scaffold or support structure, for example, a plastic supporting rack.

Figure 2:
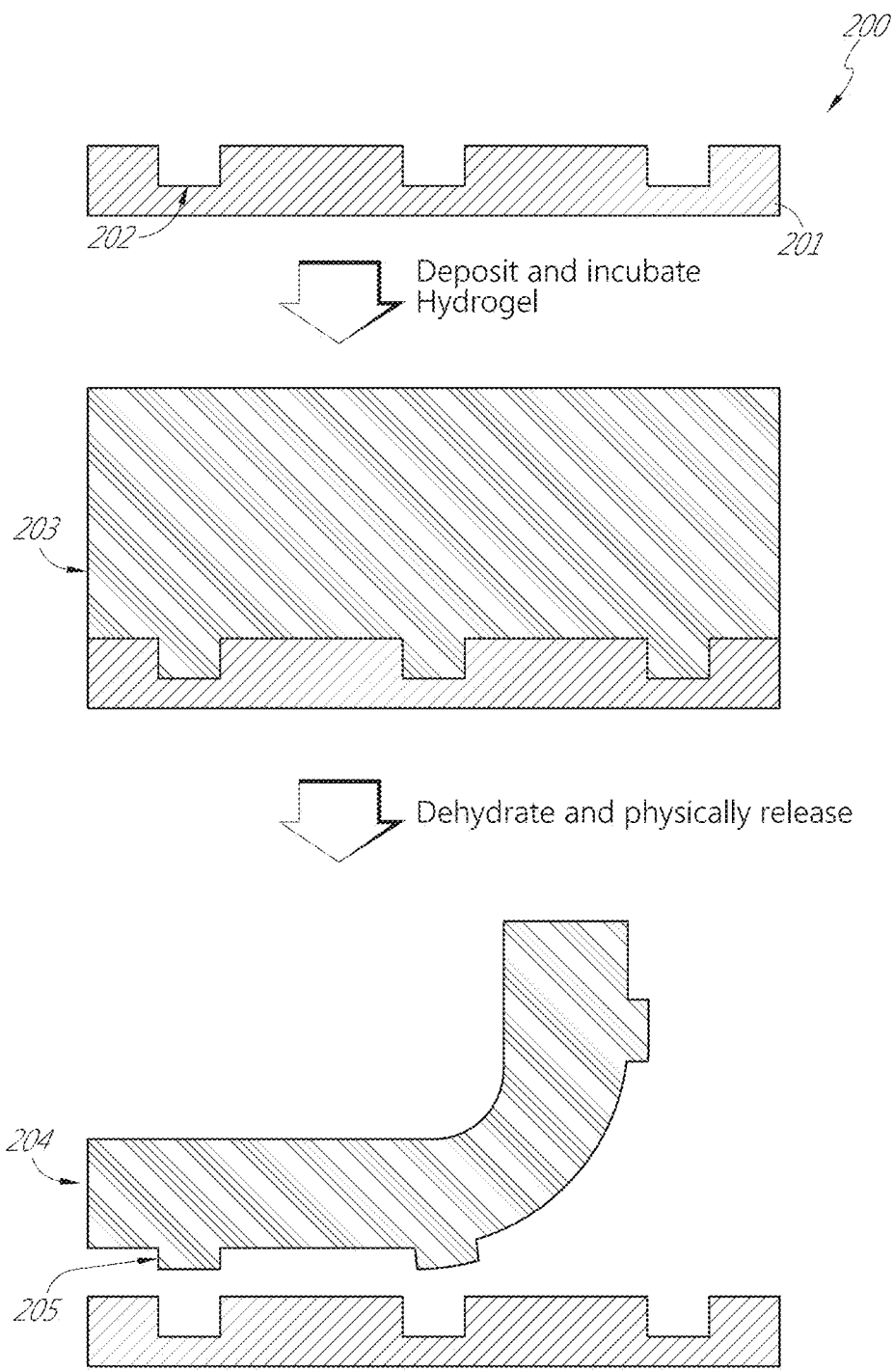
FIG. 2 illustrates a cross-sectional view of a process for preparing a patterned polymer sheet according to one embodiment.

FIG. 2 illustrates a cross-sectional view of a process for preparing a patterned polymer sheet according to some embodiments of the present application. In this specific example, PAZAM is used as the hydrogel of choice as it supports sequencing by synthesis (SBS). However, this process can also be extended to a variety of other hydrogels and polymers. First, a substrate 200 containing an underlying patterned glass plate 201 with patterns 202 and a fluorosilane layer (not shown) is provided. Then, a layer of hydrated PAZAM hydrogel 203 is deposited on top of patterned glass plate 201. Following dehydration of the hydrogel, the hydrogel forms a polymer sheet 204, containing patterns 205, which are transferred from patterns 202 of the glass plate 201. Polymer sheet 204 is subsequently removed by physical force.

The unpatterned polymer sheet of FIG. 1A and the patterned polymer sheet of FIG. 2 can scale in size to that of a microscope slide. Methods to increase the structural robustness of these polymer sheets include increasing the hydrogel polymer chain length for greater physical entanglement, adding alkyne cross-linkers to the hydrogel (for example, alkyne cross-linkers to PAZAM hydrogel), or changing the molecular weight of the hydrogel, amongst others.

Processes for Preparation of Substrate Surface for Sequencing Applications

Some embodiments described herein are related to processes of preparing a substrate surface for sequencing applications, comprising providing a polymer sheet having a first plurality of functional groups; contacting the polymer sheet with a surface of a substrate, wherein the surface includes a second plurality of functional groups; covalently bonding the first plurality of functional groups of the polymer sheet to the second plurality of functional groups of the surface. In some embodiments, incubating the polymer composition on the surface may be needed when forming covalent bonding with the surface.

In some embodiments, the processes further include grafting oligonucleotides on the substrate surface by reacting functionalized oligonucleotides with the first plurality of functional groups of the polymer sheet.

In some embodiments, the polymer sheet is patterned. In some such embodiments, the polymer sheet includes a plurality of micro-scale or nano-scale patterned channels, trenches, posts, wells, or combinations thereof.

In some embodiments, the polymer sheet includes a hydrogel. In some such embodiment, the hydrogel is dehydrated prior to covalently bonding to the substrate surface. In such embodiment, the dehydrated hydrogel is rehydrated prior to reacting with the functionalized oligonucleotides.

In some embodiments, the first plurality of functional groups of the polymer sheet include or are selected from $C_{8-14}$ cycloalkenes, 8 to 14 membered heterocycloalkenes, $C_{8-14}$ cycloalkynes, 8 to 14 membered heterocycloalkynes, alkynyl, vinyl, halo, azido, amino, amido, epoxy, glycidyl, carboxyl, hydrazonyl, hydrazinyl, hydroxy, tetrazolyl, tetrazinyl, nitrile oxide, nitrene, nitrone, oxo-amino, or thiol, or optionally substituted variants and combinations thereof. In some further embodiments, the first plurality of functional groups are selected from azido, alkynyl, amino, carboxyl, epoxy, glycidyl, halo, or tetrazinyl, or optionally substituted variants and combinations thereof. In one embodiment, the first plurality of functional groups comprises azido.

In some embodiments, the polymer sheet comprises poly (N-(5-azidoacetamidylpentyl) acrylamide-co-acrylamide) (PAZAM). In some embodiments, PAZAM may be mixed with one or more polymers or hydrogels in the preparation of the polymer composition described herein.

In some embodiments, the second plurality of functional groups of the substrate surface include or are selected from vinyl, acryloyl, alkenyl, alkynyl, $C_{8-14}$ cycloalkenes, 8 to 14 membered heterocycloalkenes, $C_{8-14}$ cycloalkynes, 8 to 14 membered heterocycloalkynes, nitrene, aldehyde, hydrazinyl, glycidyl ether, epoxy, amino, carbene, isocyanate or maleimide, or optionally substituted variants and combinations thereof. In some further embodiments, the second plurality of functional groups are selected from alkynyl, acryloyl, $C_{8-14}$ cycloalkenes, alkynyl, glycidyl ether, epoxy, or optionally substituted variants and combinations thereof. In one embodiment, the second plurality of functional groups comprises optionally substituted norbornene.

FIGS. 3A-3C illustrate a polymer sheet formed by the process illustrated in FIG. 2 and transfer of the polymer sheet onto a functionalized carrier substrate. FIG. 3A illustrates a delaminated PAZAM sheet formed according to the process illustrated in FIG. 2. FIG. 3B illustrates the suspension of the PAZAM sheet in yellow Kapton® tape. FIG. 3C illustrates the transfer of the PAZAM sheet onto a functionalized carrier substrate, for example, a norbornene coated glass slide. The functionalized carrier substrate may be any substrate with surface functional groups that can react with the functional groups in the polymer sheet. In this case, the norbornene groups in the glass slide can react with the azido groups of PAZAM to form covalent bonds between the PAZAM sheet and the substrate. Other carrier substrates can also be used in the transfer printing process, for example, silanized glass, plastic, metals, metal oxides, etc. In FIG. 3C, the norbornene silane coated glass carrier slide contains five spots of water or buffer solution. The water/buffer on the carrier substrate is used to rehydrate the hydrogel for the purpose of carrying out the subsequent surface reactions, for example, primer grafting.

Figure 4A:
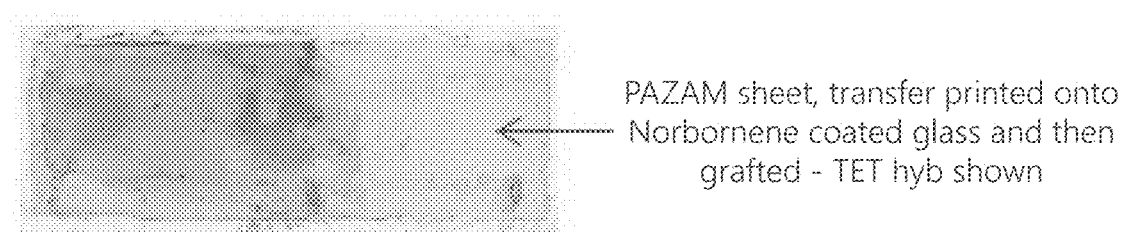
FIGS. 4A and 4B illustrate Typhoon fluorescent images of a flow cell.
Figure 4B:
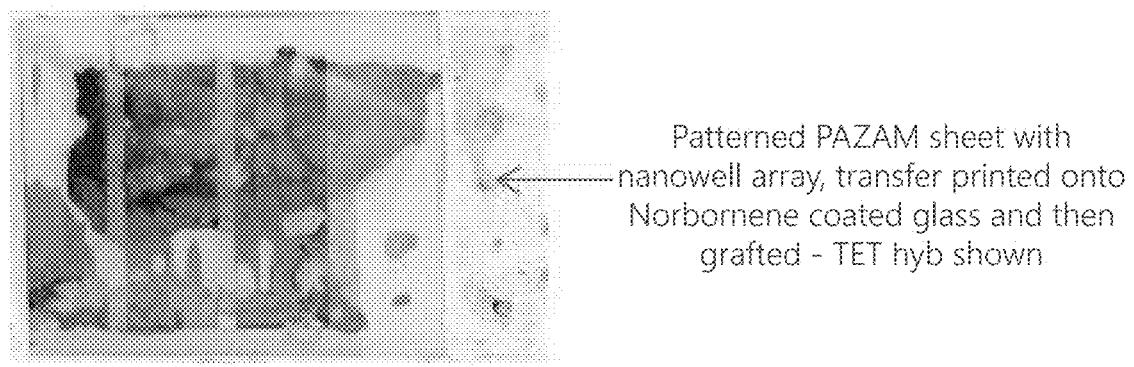

FIGS. 4A-4B illustrate fluorescent images of a flow cell taken with a GE Healthcare Lifesciences "Typhoon" imager. FIG. 4A shows a Typhoon image of a flow cell prepared by transfer of a unpatterned PAZAM sheet onto a norbornene coated glass slide and the subsequent primer grafting and TET fluorescent dye hybridizing. FIG. 4B shows a Typhoon image of a flow cell prepared by transfer of a patterned PAZAM sheet onto a norbornene coated glass slide and the subsequent primer grafting and TET fluorescent dye hybridizing. FIGS. 4A and 4B demonstrate that the surface is clearly functional following the transfer process and the array region shows a higher TET intensity.

Figure 5A:
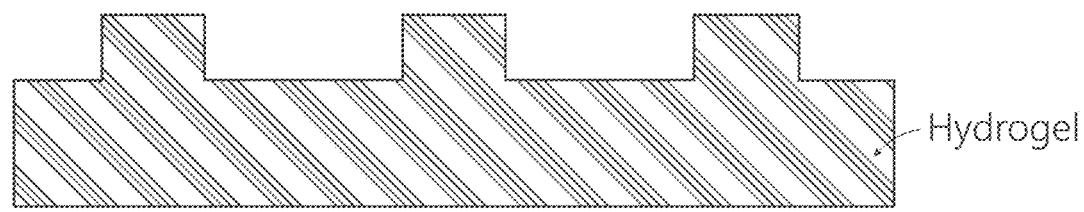
FIG. 5A illustrates a cross-sectional view of a patterned hydrogel polymer sheet with posts.
Figure 5B:
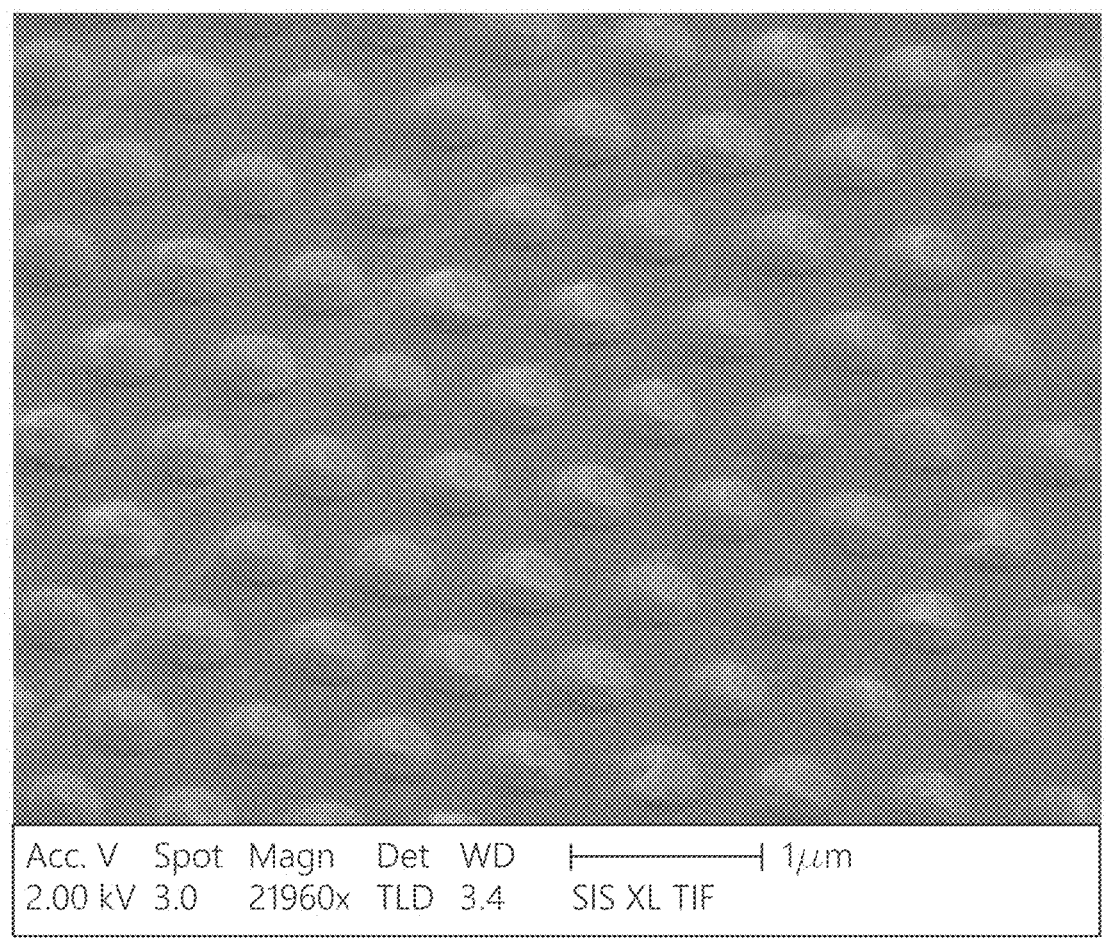
FIGS. 5B and 5C are Scanning Electron Microscope (SEM) images of patterned PAZAM sheets with a plurality of nano-scale posts.
Figure 5C:
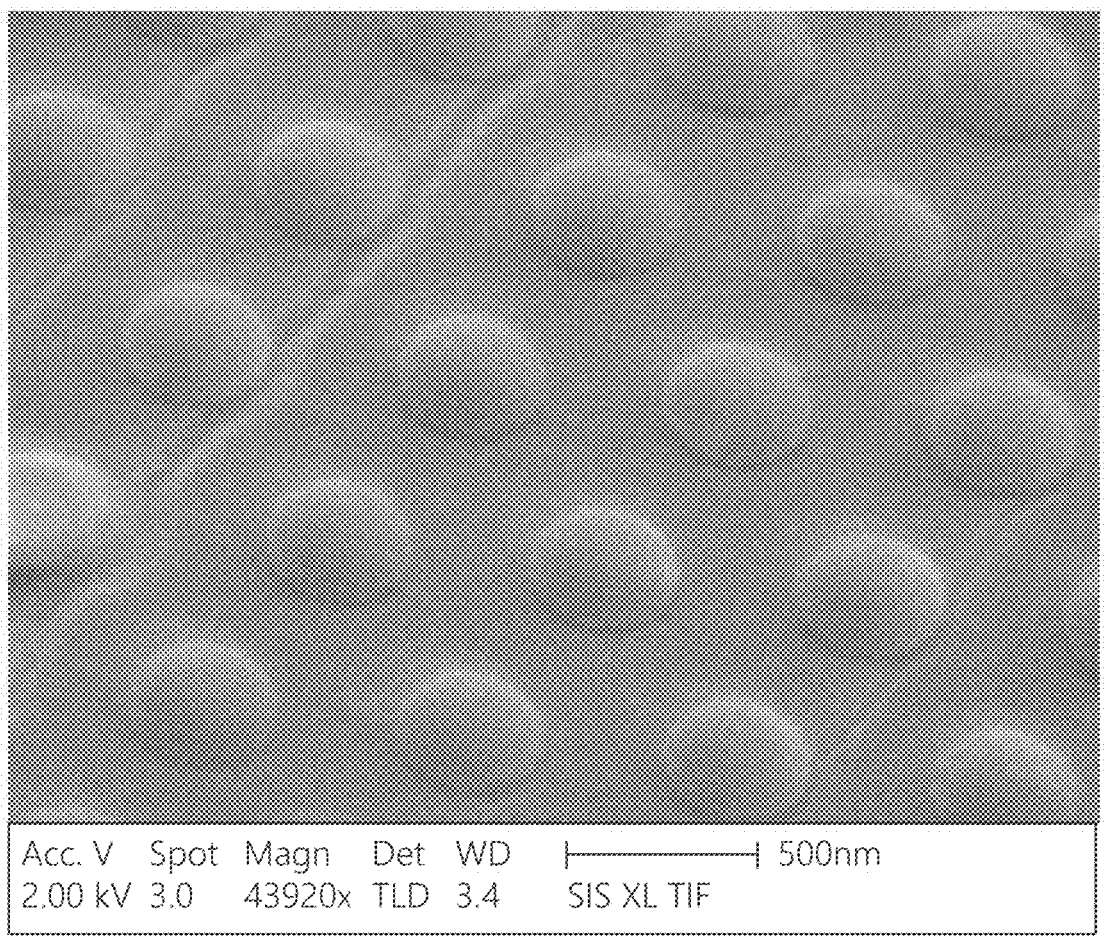

FIG. 5A illustrates a cross-sectional view of a patterned hydrogel polymer sheet with posts, prepared according to the process illustrated in FIG. 2. FIGS. 5B and 5C are SEM images of a nano-patterned PAZAM sheet formed using the process illustrated in FIG. 2. FIG. 5B shows about 400 nm diameter patterned PAZAM hydrogel posts on a suspended hydrogel sheet at a pitch of about 700 nm. FIG. 5C is a magnified image of FIG. 5B.

Some embodiments described herein are related to processes of preparing a patterned substrate surface for sequencing applications. In some embodiments, the process may include providing a substrate with a patterned surface, wherein the surface includes a plurality of micro-scale or nano-scale patterned wells. The polymer composition may then be deposited onto the patterned surface to form a first polymer layer, wherein the polymer composition fills the micro-scale or nano-scale patterned wells. The first polymer layer on the surface is then separated from the surface. This allows for the retention of the polymer composition isolated within the micro-scale or nano-scale patterned wells of the patterned surface. In some embodiments, the process further comprises dehydrating the first polymer layer prior to the separating of the first polymer layer. In some embodiments, a separate step of incubating the polymer composition may be needed when forming covalent bonding between the polymer composition and the surface of the micro-scale or nano-scale patterned wells.

In some instances, the polymer composition may be partially or completely replaced by monomer composition, a pre-polymer composition or a polymer precursor composition, wherein polymerization reaction is carried out in situ during the forming of the polymer sheet.

In some embodiments, the polymer composition includes a first plurality of functional groups selected from $C_{8-14}$ cycloalkenes, 8 to 14 membered heterocycloalkenes, $C_{8-14}$ cycloalkynes, 8 to 14 membered heterocycloalkynes, alkynyl, vinyl, halo, azido, amino, amido, epoxy, glycidyl, carboxyl, hydrazonyl, hydrazinyl, hydroxy, tetrazolyl, tetrazinyl, nitrile oxide, nitrene, nitrone, oxo-amino, or thiol, or optionally substituted variants and combinations thereof. In some further embodiments, the first plurality of functional groups are selected from azido, alkynyl, amino, carboxyl, epoxy, glycidyl, halo, or tetrazinyl, or optionally substituted variants and combinations thereof. In one embodiment, the first plurality of functional groups comprise azido.

In some embodiments, the polymer composition comprises poly(N-(5-azidoacetamidylpentyl) acrylamide-co-acrylamide) (PAZAM). In some embodiments, PAZAM may be mixed with one or more polymers or hydrogels in the preparation of the polymer composition described herein.

In some embodiments, the processes further include grafting oligonucleotides on the substrate surface by reacting functionalized oligonucleotides with the first plurality of functional groups of the polymer sheet.

In some embodiments, the polymer composition includes a hydrogel. In some such embodiment, the polymer composition is rehydrated prior to reacting with oligonucleotides.

Figure 6A:
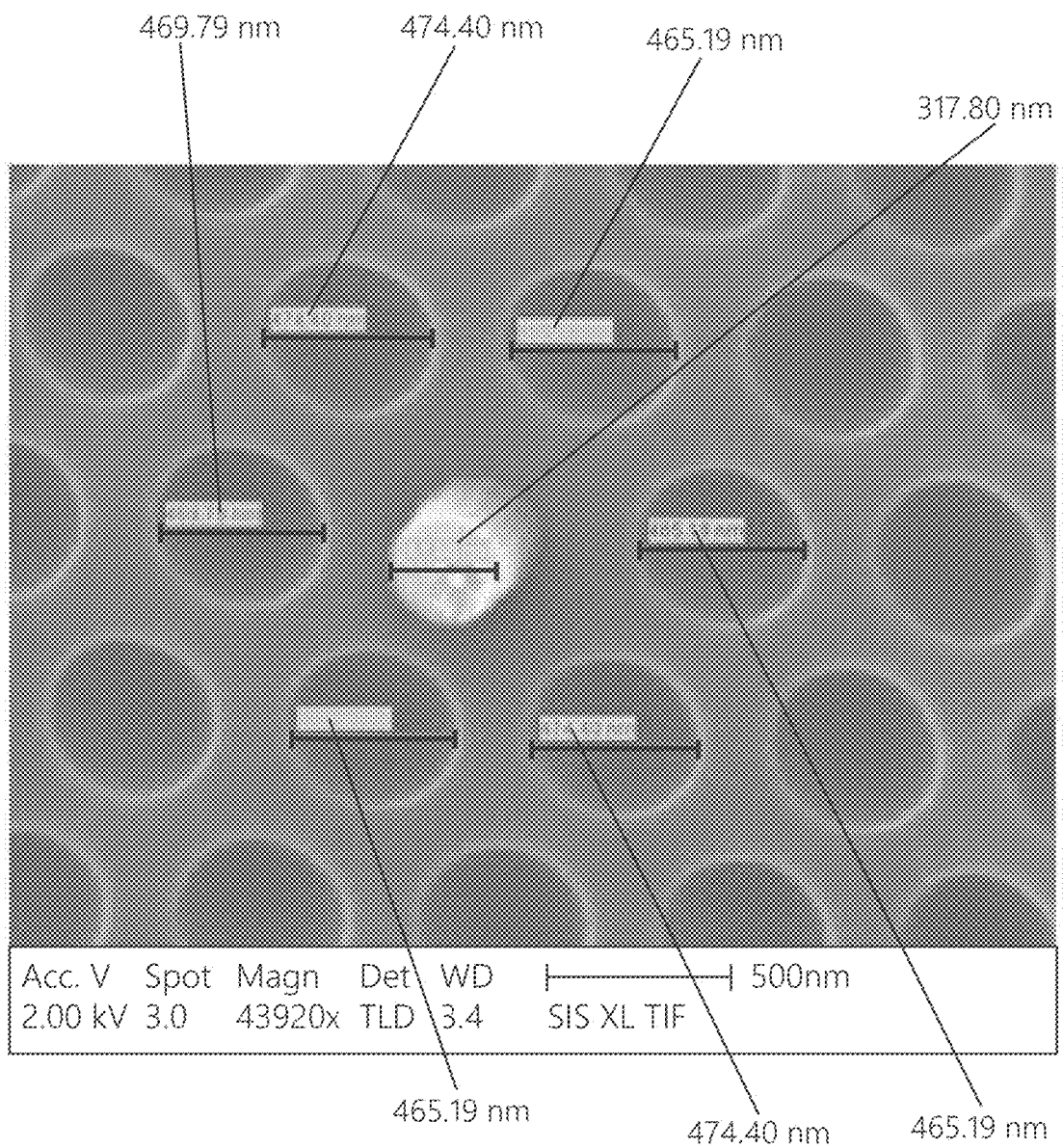
FIG. 6A is a Scanning Electron Microscopy (SEM) image of a polymer sheet containing a single polymer nano-scale post. All the rest of the nano-scale posts are isolated in the nanowells of the substrate surface.

FIG. 6A is a SEM image of a polymer sheet containing a single polymer nano-scale post. All the rest of the nano-scale posts are isolated in the nanowells of the substrate surface.

Figure 6B:
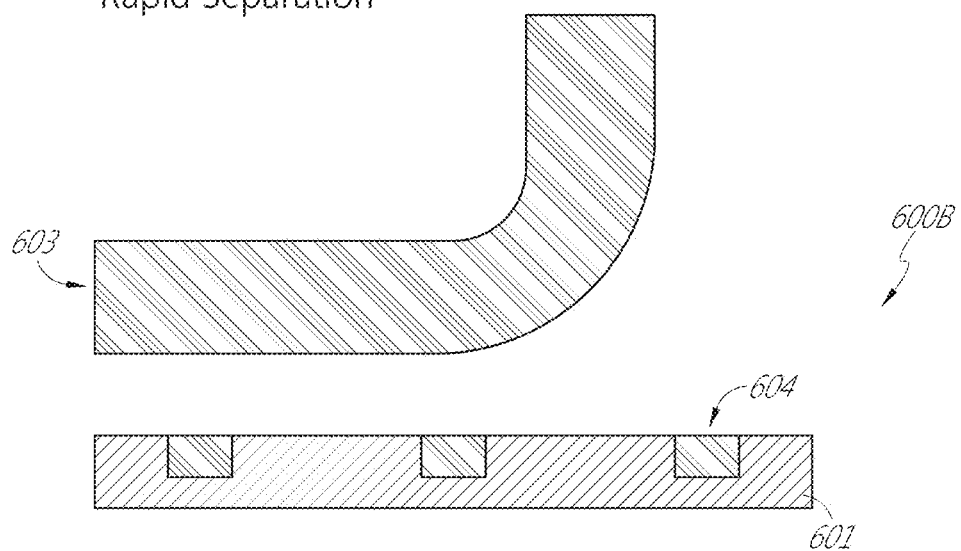
FIG. 6B is a cross-sectional view of a rapid separation of a hydrogel sheet from a patterned substrate surface wherein some polymer material is left within depressions of a surface, according to some embodiments of the present application.

FIG. 6B is a cross-sectional view of a rapid separation of a hydrogel sheet from a patterned substrate surface according to some embodiments of the present application. In a specific embodiment, a substrate 600B containing an underlying glass plate 601 and a surface with patterned nanowells is deposited with a layer of hydrogel composition. After dehydrating the hydrogel composition, the formed hydrogel sheet 603 is rapidly separated from the surface of the glass plate 601, resulting in the isolation of the patterned hydrogel composition 604 in the nanowells of the substrate.

Figure 6C:
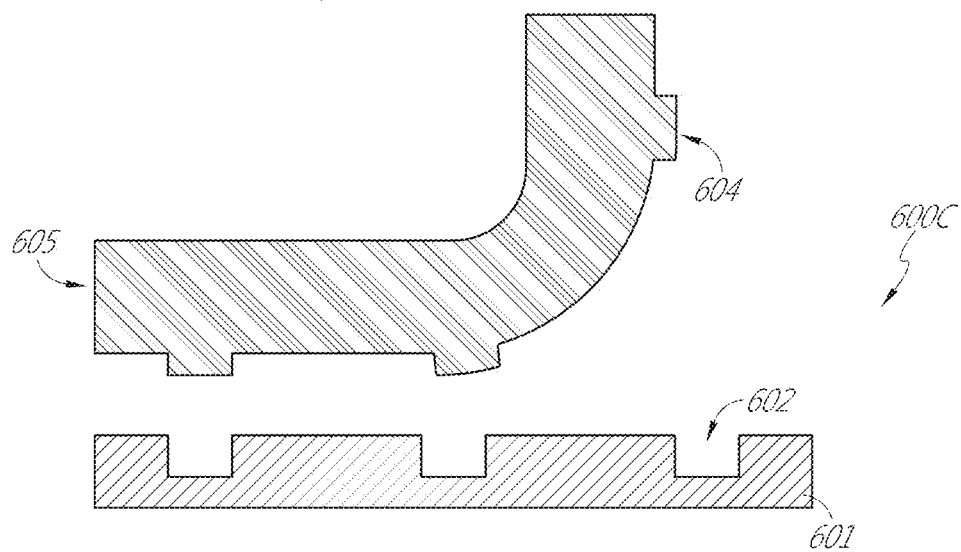
FIG. 6C is a cross-sectional view of a controlled separation of a hydrogel sheet from a patterned substrate surface wherein some of the polymer material remains attached to the hydrogel sheet, according to some embodiments of the present application.

FIG. 6C is a cross-sectional view of a controlled separation of a hydrogel sheet from a patterned substrate surface according to some embodiments of the present application. Similar to the embodiment shown in FIG. 6B, a substrate 600C containing an underlying glass plate 601 and a surface with patterned nanowells is deposited with a layer of hydrogel composition. After dehydrating the hydrogel composition, the formed hydrogel sheet 605 is separated from the surface of the glass plate 601 with controlled force, resulting in the retention of the patterned structures 604 transferred from the substrate surface 602 to the hydrogel sheet 605.

In some embodiments, the processes further include laminating a second polymer layer directly on top of the patterned surface after separating the first polymer layer.

In some embodiments, the second polymer layer includes a second plurality of functional groups selected from vinyl, acryloyl, alkenyl, alkynyl, $C_{8-14}$ cycloalkenes, 8 to 14 membered heterocycloalkenes, $C_{8-14}$ cycloalkynes, 8 to 14 membered heterocycloalkynes, nitrene, aldehyde, hydrazinyl, glycidyl ether, epoxy, amino, carbene, isocyanate or maleimide, or optionally substituted variants and combinations thereof. In some further embodiments, the second plurality of functional groups are selected from alkynyl, acryloyl, $C_{8-14}$ cycloalkenes, alkynyl, glycidyl ether, epoxy, or optionally substituted variants and combinations thereof. In one embodiment, the second plurality of functional groups comprises optionally substituted norbornene.

In some embodiments, the second polymer layer is first treated with a functional silane or silane derivative before lamination. The functional silane or silane derivatives provide reactive sites on the surface of the second polymer sheet for reaction with the polymer composition isolated in the patterned surface of the substrate. In one embodiment, the surface is treated with a norbornene silane, for example, [(5-bicyclo[2.2.1]hept-2-enyl)ethyl]trimethoxysilane. Other suitable silane derivatives that can be used in the present application are described in U.S. Pub. No. 2015/0005447 A1, which is hereby incorporated by reference in its entirety.

In some embodiments, the first plurality of functional groups of the polymer composition react with the second plurality of functional groups of the second polymer layer to form covalent bonds. In some such embodiments, the polymer composition is rehydrated before reacting with the second plurality of functional groups.

In some such embodiments, the processes further include separating the second polymer layer from the patterned surface after covalent bonds are formed between the second polymer layer and the first plurality of functional groups of the polymer composition, resulting in the removal of the polymer composition from the micro-scale or nano-scale patterned wells of the substrate surface to form patterned polymer posts on the second polymer layer. In some embodiments, the polymer composition is dehydrated before separating from the patterned wells of the substrate surface with the second polymer layer.

In some embodiments, the second polymer layer is flexible or stretchable. In some such embodiments, the second polymer layer comprises polydimethylsiloxane (PDMS), poly(methyl methacrylate) (PMMA), polyacrylates, polyacrylic acids, polyurethanes, polyethers, polycarbonates, polyvinyls, Kapton® polyimides, or combinations and copolymers thereof.

In some embodiments, the processes further include grafting oligonucleotides on the second polymer layer by reacting functionalized oligonucleotides with the first plurality of functional groups of the polymer sheet.

Figure 7A:
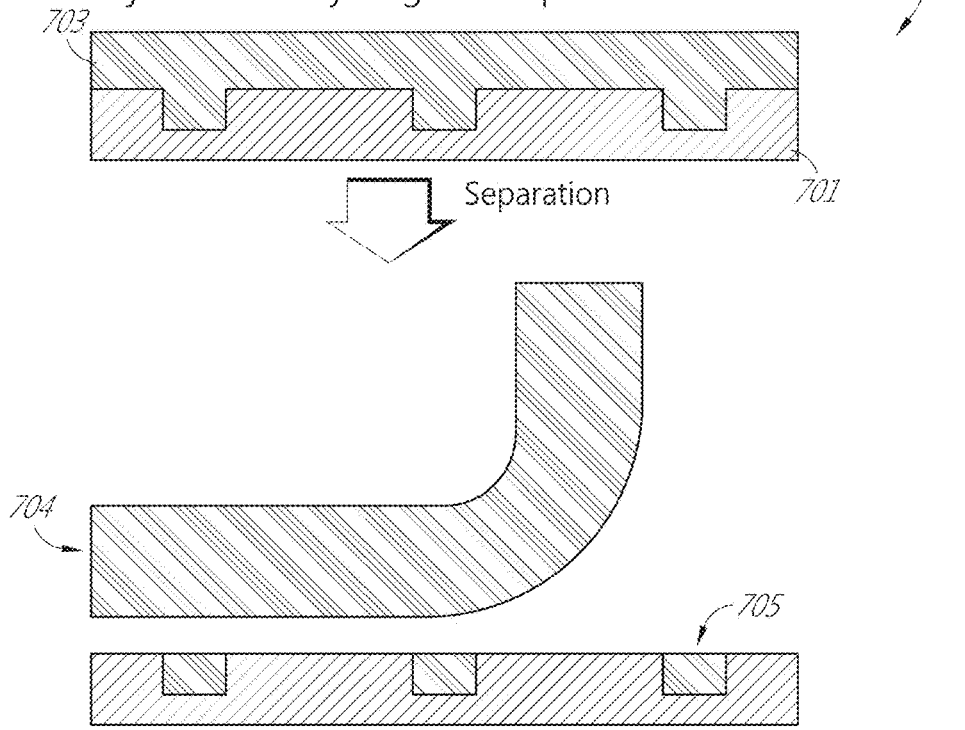
FIG. 7A is a cross-sectional view of a process of forming hydrogel filled nanowells on a substrate surface according to some embodiments of the present application.

FIG. 7A is a cross-sectional view of a process of forming hydrogel filled nanowells on a substrate surface according to some embodiments of the present application. In a specific embodiment, a substrate 700 containing an underlying glass plate 701 and a surface with patterned nanowells is deposited with a layer of hydrogel composition 703. After dehydrating the hydrogel composition, the formed hydrogel sheet 704 is rapidly separated from the surface of the glass plate 701, resulting in the isolation of the patterned hydrogel composition 705 in the nanowells of the substrate.

Figure 7B:
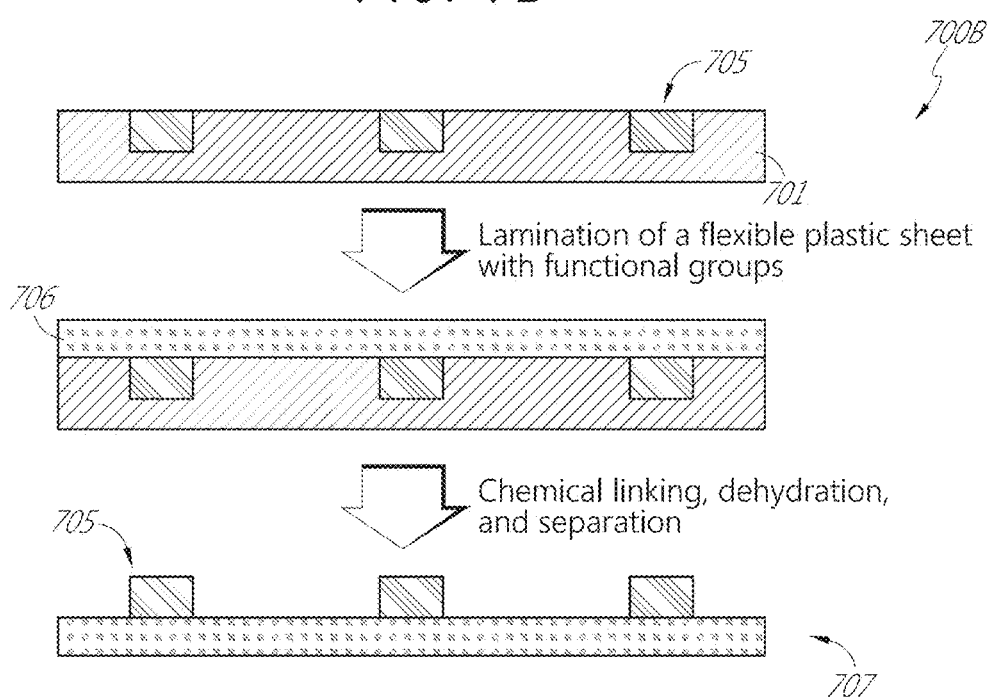
FIG. 7B is a cross-sectional view of a process of forming a flexible sheet containing patterned hydrogel.

FIG. 7B is a cross-sectional view of a process of forming a flexible sheet containing patterned hydrogel. First, a substrate 700B containing patterned hydrogel composition 705 isolated in the patterned nanowells of a glass plate 701 formed according to the process described in FIG. 7A is laminated with a flexible sheet 706 containing certain functional groups that are capable of reacting with the hydrogel composition 705. After the rehydrating the hydrogel composition 705, covalent bonds are formed between the hydrogel composition 705 and the flexible sheet 706 through reaction of the functional groups in the hydrogel composition and the functional groups in the flexible sheet. After dehydrating the hydrogel composition 705, a newly formed flexible sheet 707 containing covalently bonded patterned hydrogel 705 is peeled off from the glass plate 701. In some embodiments, flexible sheet 705 is made from polymer materials such as cyclic olefin copolymer (COC) or plastic.

Some embodiments described herein are related to a substrate surface for sequencing applications prepared by the processes described herein.

Roll-to-Roll and Belt Processes

Some further embodiments described herein are related to automated roll-to-roll processes, for example, for sequencing applications. This process may include spooling a roll of patterned or unpatterned, polymer sheets prepared by the process described herein. The polymer sheets can be prepared for sequencing reactions by treatment with sequencing reagents and then sequencing a sample on the treated polymer sheet. After treatment, the polymer sheet can be respooled after the completion of one sequencing cycle.

In some embodiments, the polymer sheets that are used in a roll to roll process are stretchable. Accordingly, the automated processes can further include stretching the polymer sheet during imaging in the sequencing cycle.

In some embodiments, the polymer sheet comprises polydimethylsiloxane (PDMS), poly(methyl methacrylate) (PMMA), polyacrylates, polyacrylic acids, polyurethanes, polyethers, polycarbonates, polyvinyls, Kapton® polyimides, or combinations and copolymers thereof.

Figure 8:
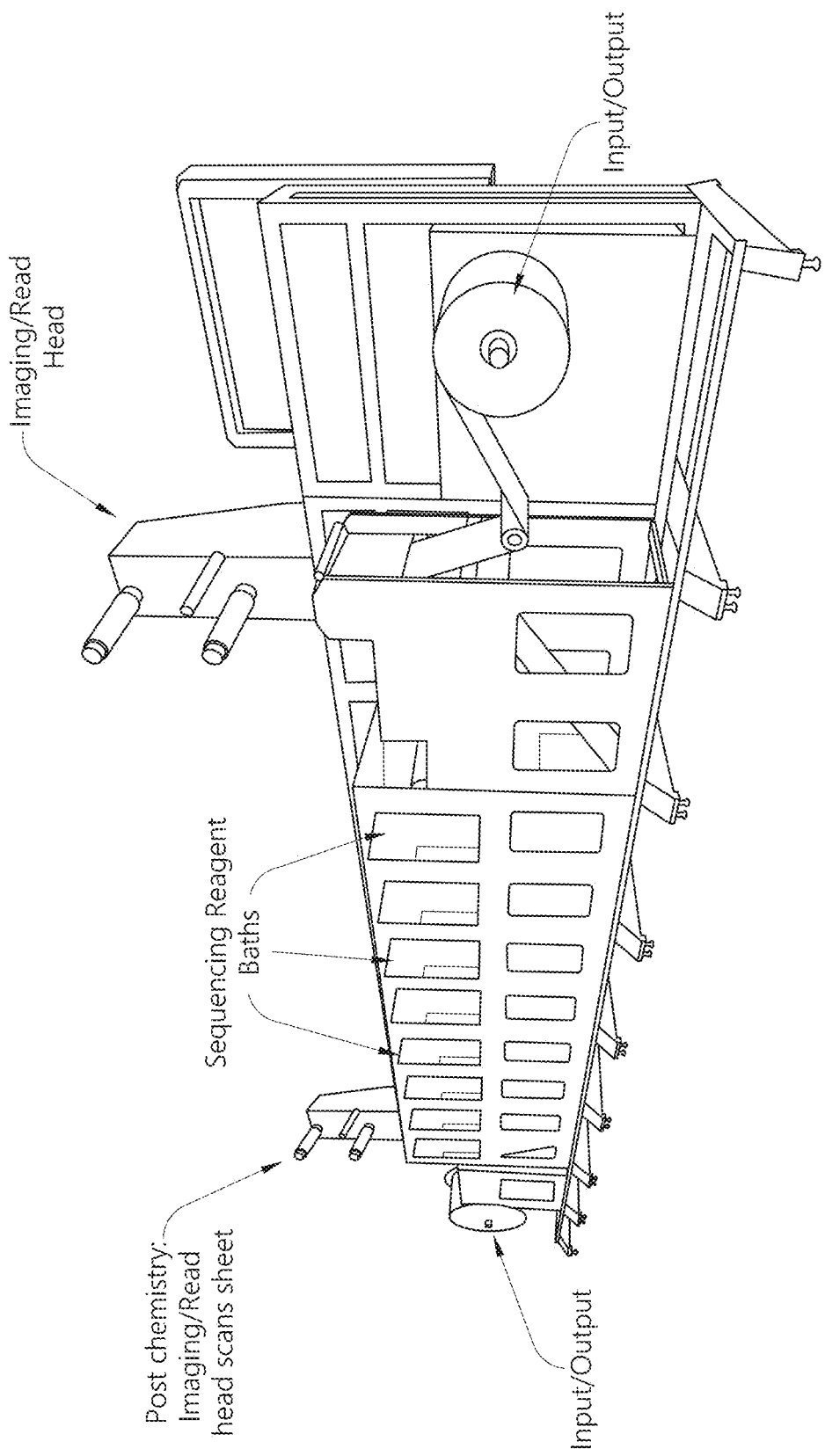
FIG. 8 is a schematic view of an automated factory-scale sequencing process using roll-to-roll flexible sheets patterned with polymers or hydrogels compatible for sequencing-by-synthesis (SBS) application prepared by the process illustrated in FIGS. 7A and 7B.

FIG. 8 is a schematic view of an automated factory-scale sequencing process using roll-to-roll flexible sheets patterned with polymers or hydrogels compatible for sequencing-by-synthesis (SBS) applications prepared by the process illustrated in FIGS. 7A and 7B. In each sequencing cycle, the roll is fed through the system through the various SBS reagent baths (e.g., incorporation, rinse, deblock sequentially) and imaged by the read head on the other side of the system and respooled. The roll is then fed though the system in the opposite direction to commence the next cycle of sequencing.

Figure 9:
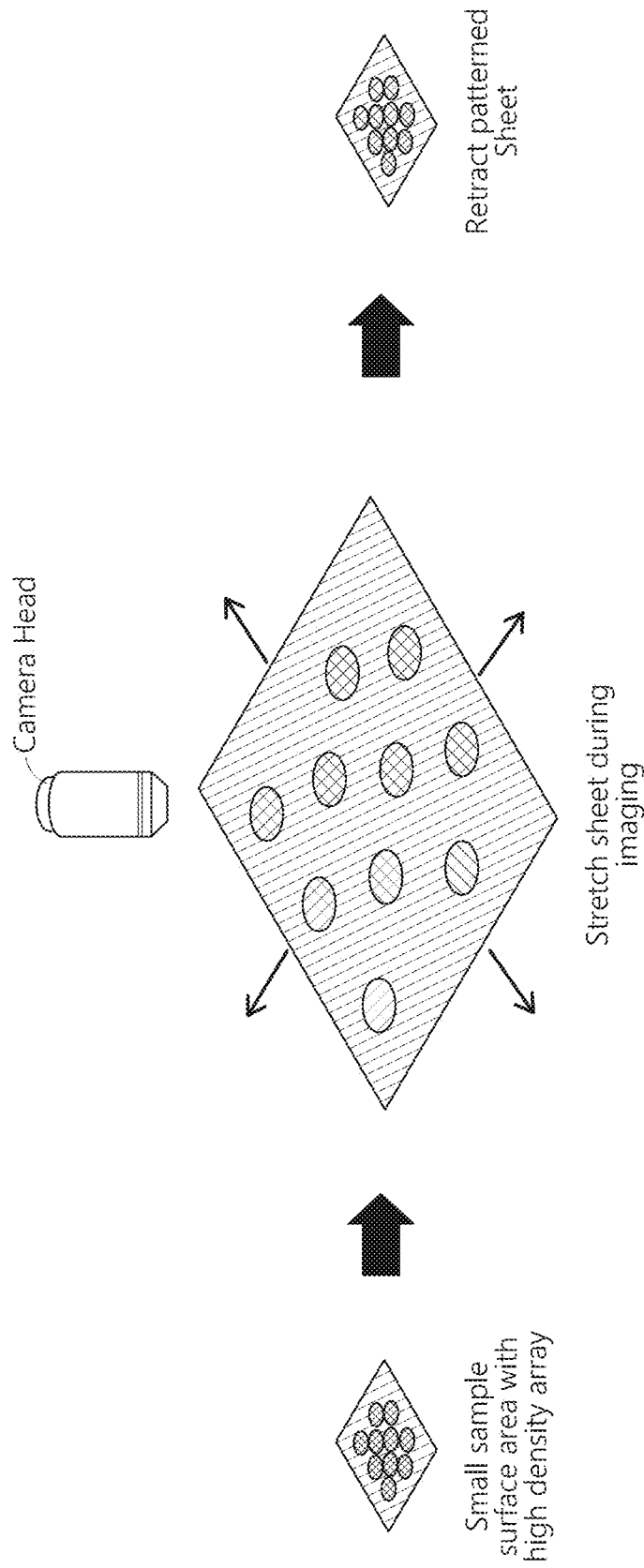
FIG. 9 illustrates the portion of an automated roll-to-roll sequencing process depicted in FIG. 8 where the flexible patterned sheet is stretched during imaging and retracted following imaging.

FIG. 9 illustrates the portion of an automated roll-to-roll sequencing process depicted in FIG. 8 where the flexible patterned sheet is stretched during imaging and retracted following imaging. The use of these stretchable patterned sheets opens up the possibility for preparing ultra-high density SBS arrays and then imaging them using low-cost, low numerical aperture (NA) optics. Patterning high density arrays with a small surface area foot print results in the need for lower DNA input and reagent volumes. By stretching this flexible sheet array, the array pitch is increased and cross-talk between adjacent clusters is decreased, which enable the use of low cost, low NA optics. To reduce image distortion, these surfaces can be deformed to compensate for aberration. This flexible, stretchable SBS surface can also be wrapped around the imaging lens itself. Following imaging, the sheet is allowed to retract and proceeds into the next cycle of SBS chemistry.

Some further embodiments described herein are related to automated belt drive processes, for example, for sequencing applications. This process may include driving a belt of patterned or unpatterned, polymer sheets prepared by the process described herein. The polymer sheets can be prepared for sequencing reactions by treatment with sequencing reagents and then sequencing a sample on the treated polymer sheet. The belt can make multiple passes through a fluidic delivery and detection system such that each passage constitutes one sequencing cycle. Methods for forming and using belts for nucleic acid sequencing and other applications that can be modified for us herein are set forth, for example, in U.S. Pat. App. Pub. No. 2011/0178285 A1, which is incorporated herein by reference.

In any of the disclosed embodiments, the dehydration of the polymer composition may cause the volume of the polymer composition to decrease by over 20 times, over 15 times, over 10 times, over 5 times, or over 2 times, or a range defined by any two of the preceding values.

In any of the disclosed embodiments of the flexible or stretchable polymer sheets, the sheet may be stretched to about 20 times, about 17.5 times, about 15 times, about 12.5 times, about 10 times, about 7.5 times, about 5 times, about 2.5 times, about 2 times, or about 1.5 times of its original dimension or length, or a range defined by any two of the preceding values.

In any of the disclosed embodiments, the micro-scale or nano-scale patterns of the substrate surface may include channels, trenches, wells, posts, or combinations thereof. In some embodiments, at least a portion of the micro-scale or nano-scale patterns are wells. In some such embodiments, the wells have an average diameter of less than about 500 nm. In some instances, the wells having an average diameter of less than about 500 nm are called "nanowells." In some such embodiments, the wells have an average diameter of about 330 nm or less including, for example, less than about 300 nm, about 200 nm, about 100 nm, or about 50 nm, or a range defined by any of the two preceding values. In some such embodiments, the wells have an average height of less than about 500 nm. In some further embodiments, the wells have an average height of about 300 nm or less including, for example, less than about 300 nm, about 200 nm, about 100 nm, or about 50 nm, or a range defined by any of the two preceding values. Alternatively or additionally to the exemplary upper limits the average diameter and/or average height of the wells can be at most about 1 mm, about 500 μm, about 100 μm, about 1 μm, about 500 nm, about 400 nm, about 300 nm, about 200 nm or about 100 nm, or a range defined by any of the two preceding values.

Substrates

In some embodiments, substrates used in the present application include silica-based substrates, such as glass, fused silica and other silica-containing materials. In some embodiments, silica-based substrates can also be silicon, silicon dioxide, silicon nitride, silicone hydrides. In some embodiments, substrates used in the present application include plastic materials such as polyethylene, polystyrene, poly(vinyl chloride), polypropylene, nylons, polyesters, polycarbonates and poly(methyl methacrylate). Preferred plastics materials are poly(methyl methacrylate), polystyrene and cyclic olefin polymer substrates. In some embodiments, the substrate is a silica-based material or plastic material. In one embodiment, the substrate has at least one surface comprising glass.

Acrylamide, enone, or acrylate may also be utilized as a substrate material. Other substrate materials can include, but are not limited to gallium arsenide, indium phosphide, aluminum, ceramics, polyimide, quartz, resins, polymers and copolymers. The foregoing lists are intended to be illustrative of, but not limited to the present application.

In some embodiments, the substrate and/or the substrate surface can be quartz. In some other embodiments, the substrate and/or the substrate surface can be semiconductor, i.e. GaAs or ITO.

Substrates can comprise a single material or a plurality of different materials. Substrates can be composites or laminates. Substrate can be flat, round, textured and patterned. Patterns can be formed, for example, by metal pads that form features on non-metallic surfaces, for example, as described in U.S. Pat. No. 8,778,849, which is incorporated herein by reference. Another useful patterned surface is one having well features formed on a surface, for example, as described in U.S. Pat. App. Pub. No. 2014/0243224 A1, U.S. Pat. App. Pub. No. 2011/0172118 A1 or U.S. Pat. No. 7,622,294, each of which is incorporated herein by reference. For embodiments that use a patterned substrate, a gel can be selectively attached to the pattern features (e.g. gel can be attached to metal pads or gel can be attached to the interior of wells) or alternatively the gel can be uniformly attached across both the pattern features and the interstitial regions.

Advantages in using plastics-based substrates in the preparation and use of molecular arrays include cost: the preparation of appropriate plastics-based substrates by, for example injection-molding, is generally less expensive than the preparation, e.g. by etching and bonding, of silica-based substrates. Another advantage is the nearly limitless variety of plastics allowing fine-tuning of the optical properties of the support to suit the application for which it is intended or to which it may be put.

Where metals are used as substrates or as pads on a substrate, this may be because of the desired application: the conductivity of metals can allow modulation of the electric field in DNA-based sensors. In this way, DNA mismatch discrimination may be enhanced, the orientation of immobilized oligonucleotide molecules can be affected, or DNA hybridization kinetics can be accelerated.

The substrate may be silica-based. In addition, the form and shape of the substrate employed may be varied in accordance with the application for which the present application is practiced. Generally, however, slides of support material, such as silica, e.g. fused silica, are of particular utility in the preparation and subsequent integration of molecules. Of particular use in the practice of the present application are fused silica slides sold under the trade name SPECTRASIL™. This notwithstanding, it will be evident to the skilled person that the present application is equally applicable to other presentations of substrate (including silica-based supports), such as beads, rods and the like.

In some embodiments, the surface of the substrate comprises both functional molecules-coated regions and inert regions with no coatings. In some instances, the functionalized molecule coatings include hydrogel or polymer sheets described herein. The functional molecules-coated regions can comprise reactive sites, and thus, can be used to attach molecules through chemical bonding or other molecular interactions. In some embodiments, the functional molecules-coated regions (e.g. reactive features, pads, beads or wells) and the inert regions (referred to as interstitial regions) can alternate so as to form a pattern or a grid. Such patterns can be in one or two dimensions. In some embodiments, the inert regions can be selected from glass regions, metal regions, mask regions or interstitial regions. Alternatively these materials can form reactive regions. Inertness or reactivity will depend on the chemistry and processes used on the substrate. In one embodiment, the surface comprises glass regions. In another embodiment, the surface comprises metal regions. In still another embodiment, the surface comprises mask regions. Non-limiting exemplary substrate materials that can be coated with a polymer of the present disclosure or that can otherwise be used in a composition or method set forth herein are described in U.S. Ser. Nos. 13/492,661 and 13/661,524, each of which is incorporated herein by reference.

In some embodiments, a substrate described herein forms at least part of a flow cell or is located in a flow cell. In some such embodiments, the flow cells further comprise polynucleotides attached to the surface of the substrate via the functional molecules coating, for example, a polymer coating. In some instances, the polymer coating is a polymer sheet described herein. In some embodiments, the polynucleotides are present in the flow cells in polynucleotide clusters, wherein the polynucleotides of the polynucleotide clusters are attached to a surface of the flow cell via the polymer coating or the polymer sheet described herein. In such embodiments, the surface of the flow cell body to which the polynucleotides are attached is considered the substrate. In other embodiments, a separate substrate having a polymer coated surface is inserted into the body of the flow cell. In preferred embodiments, the flow cell is a flow chamber that is divided into a plurality of lanes or a plurality of sectors, wherein one or more of the plurality of lanes or plurality of sectors comprises a surface that is coated with a covalently attached polymer sheet described herein. In some embodiments of the flow cells described herein, the attached polynucleotides within a single polynucleotide cluster have the same or similar nucleotide sequence. In some embodiments of the flow cells described herein, the attached polynucleotides of different polynucleotide clusters have different or nonsimilar nucleotide sequences. Exemplary flow cells and substrates for manufacture of flow cells that can be used in method or composition set forth herein include, but are not limited to, those commercially available from Illumina, Inc. (San Diego, Calif.) or described in U.S. Pat. App. Pub. Nos. 2010/0111768 A1 or 2012/0270305 A1, each of which is incorporated herein by reference.

In some embodiments, the substrates used in the present application are silica-based substrates. In general, a silica-based substrate surface can be chemically modified in some way so as to attach covalently a chemically reactive group capable of reacting with the functionalized molecules, for example, hydrogel, polymer or a partially formed hydrogel (e.g. a prepolymer (PRP)). The surface-activating agent is typically an organosilane compound. In one embodiment, the surface-activating agent is γ-methacryloxypropyltrimethoxysilane, known as "Bind Silane" or "Crosslink Silane" and commercially available from Pharmacia, although other silicon-based surface-activating agents are also known, such as monoethoxydimethylsilylbutanal, 3-mercaptopropyl-trimethoxysilane and 3-aminopropyltrimethoxysilane (all available from Aldrich). In this way, pendant functional groups such as amino groups, aldehydro groups or polymerizable groups (e.g. olefins) may be attached to the silica.

In any embodiments described herein, the substrate may be selected from a glass substrate, a silica substrate, a quartz substrate, a plastic substrate, a metal substrate, a metal oxide substrate, or combinations thereof. In some embodiments, the substrate is a glass substrate. In one embodiment, the substrate is part of a flow cell or housed within a flow cell.

Nucleic Acid Analysis Applications

Many different DNA amplification techniques can be used in conjunction with the flow cells described herein. Exemplary techniques that can be used include, but are not limited to, polymerase chain reaction (PCR), rolling circle amplification (RCA), multiple displacement amplification (MDA), or random prime amplification (RPA). In particular embodiments, one or more primers used for amplification can be attached to a polymer coating. In PCR embodiments, one or both of the primers used for amplification can be attached to a polymer coating. Formats that utilize two species of attached primer are often referred to as bridge amplification because double stranded amplicons form a bridge-like structure between the two attached primers that flank the template sequence that has been copied. Exemplary reagents and conditions that can be used for bridge amplification are described, for example, in U.S. Pat. No. 5,641,658; U.S. Patent Publ. No. 2002/0055100; U.S. Pat. No. 7,115,400; U.S. Patent Publ. No. 2004/0096853; U.S. Patent Publ. No. 2004/0002090; U.S. Patent Publ. No. 2007/0128624; and U.S. Patent Publ. No. 2008/0009420, each of which is incorporated herein by reference. PCR amplification can also be carried out with one of the amplification primers attached to a polymer coating and the second primer in solution. An exemplary format that uses a combination of one attached primer and soluble primer is emulsion PCR as described, for example, in Dressman et al., *Proc. Natl. Acad. Sci.* USA 100:8817-8822 (2003), WO 05/010145, or U.S. Patent Publ. Nos. 2005/0130173 or 2005/0064460, each of which is incorporated herein by reference. Emulsion PCR is illustrative of the format and it will be understood that for purposes of the methods set forth herein the use of an emulsion is optional and indeed for several embodiments an emulsion is not used. Furthermore, primers need not be attached directly to substrate or solid supports as set forth in the ePCR references and can instead be attached to a polymer coating as set forth herein.

RCA techniques can be modified for use in a method of the present disclosure. Exemplary components that can be used in an RCA reaction and principles by which RCA produces amplicons are described, for example, in Lizardi et al., *Nat. Genet.* 19:225-232 (1998) and US 2007/0099208 A1, each of which is incorporated herein by reference. Primers used for RCA can be in solution or attached to a polymer coating.

MDA techniques can be modified for use in a method of the present disclosure. Some basic principles and useful conditions for MDA are described, for example, in Dean et al., *Proc Natl. Acad. Sci.* USA 99:5261-66 (2002); Lage et al., *Genome Research* 13:294-307 (2003); Walker et al., *Molecular Methods for Virus Detection*, Academic Press, Inc., 1995; Walker et al., *Nucl. Acids Res.* 20:1691-96 (1992); U.S. Pat. Nos. 5,455,166; 5,130,238; and 6,214,587, each of which is incorporated herein by reference. Primers used for MDA can be in solution or attached to a polymer coating.

In particular embodiments a combination of the above-exemplified amplification techniques can be used. For example, RCA and MDA can be used in a combination wherein RCA is used to generate a concatameric amplicon in solution (e.g. using solution-phase primers). The amplicon can then be used as a template for MDA using primers that are attached to a polymer coating. In this example, amplicons produced after the combined RCA and MDA steps will be attached to the polymer coating.

In some embodiments, the functionalized hydrogel or polymer sheet coated substrate described herein can be used for determining a nucleotide sequence of a polynucleotide. In such embodiments, the method may include the steps of (a) contacting a polynucleotide polymerase with polynucleotide clusters attached to a surface of a substrate via any one of the polymer or hydrogel coatings described herein; (b) providing nucleotides to the polymer-coated surface of the substrate such that a detectable signal is generated when one or more nucleotides are utilized by the polynucleotide polymerase; (c) detecting signals at one or more polynucleotide clusters; and (d) repeating steps (b) and (c), thereby determining a nucleotide sequence of a polynucleotide present at the one or more polynucleotide clusters.

Nucleic acid sequencing can be used to determine a nucleotide sequence of a polynucleotide by various processes known in the art. In a preferred method, sequencing-by-synthesis (SBS) is utilized to determine a nucleotide sequence of a polynucleotide attached to a surface of a substrate via any one of the polymer coatings described herein. In such process, one or more nucleotides are provided to a template polynucleotide that is associated with a polynucleotide polymerase. The polynucleotide polymerase incorporates the one or more nucleotides into a newly synthesized nucleic acid strand that is complementary to the polynucleotide template. The synthesis is initiated from an oligonucleotide primer that is complementary to a portion of the template polynucleotide or to a portion of a universal or non-variable nucleic acid that is covalently bound at one end of the template polynucleotide. As nucleotides are incorporated against the template polynucleotide, a detectable signal is generated that allows for the determination of which nucleotide has been incorporated during each step of the sequencing process. In this way, the sequence of a nucleic acid complementary to at least a portion of the template polynucleotide can be generated, thereby permitting determination of the nucleotide sequence of at least a portion of the template polynucleotide.

Flow cells provide a convenient format for housing an array that is produced by the methods of the present disclosure and that is subjected to a sequencing-by-synthesis (SBS) or other detection technique that involves repeated delivery of reagents in cycles. For example, to initiate a first SBS cycle, one or more labeled nucleotides, DNA polymerase, etc., can be flowed into/through a flow cell that houses a nucleic acid array made by methods set forth herein. Those sites of an array where primer extension causes a labeled nucleotide to be incorporated can be detected. Optionally, the nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination, a deblocking reagent can be delivered to the flow cell (before or after detection occurs). Washes can be carried out between the various delivery steps. The cycle can then be repeated n times to extend the primer by n nucleotides, thereby detecting a sequence of length n. Exemplary SBS procedures, fluidic systems and detection platforms that can be readily adapted for use with an array produced by the methods of the present disclosure are described, for example, in Bentley et al., *Nature* 456: 53-59 (2008), WO 04/018497; U.S. Pat. No. 7,057,026; WO 91/06678; WO 07/123744; U.S. Pat. Nos. 7,329,492; 7,211,414; 7,315,019; 7,405,281, and U.S. 2008/0108082, each of which is incorporated herein by reference in its entirety. In particular embodiments, similar methods to those exemplified above for a flow cell can be carried out using a polymer sheet in place of a flow cell. For example, the polymer sheet can be provided in a roll to roll or belt format to allow repeated delivery of reagents to the surface of the polymer sheet akin to the repeated delivery of reagents to a flow cell. It will be understood that in some embodiments a polymer sheet of the present disclosure can be present in a flow cell for all or part of a sequencing process.

Other sequencing procedures that use cyclic reactions can employ a polymer sheet, substrate or other composition set forth herein, such as pyrosequencing. Pyrosequencing detects the release of inorganic pyrophosphate (PPi) as particular nucleotides are incorporated into a nascent nucleic acid strand (Ronaghi, et al., *Analytical Biochemistry* 242(1), 84-9 (1996); Ronaghi, *Genome Res.* 11(1), 3-11 (2001); Ronaghi et al. *Science* 281(5375), 363 (1998); U.S. Pat. Nos. 6,210,891; 6,258,568 and 6,274,320, each of which is incorporated herein by reference in its entirety). In pyrosequencing, released PPi can be detected by being immediately converted to adenosine triphosphate (ATP) by ATP sulfurylase, and the level of ATP generated can be detected via luciferase-produced photons. Thus, the sequencing reaction can be monitored via a luminescence detection system. Excitation radiation sources used for fluorescence based detection systems are not necessary for pyrosequencing procedures. Useful fluidic systems, detectors and procedures that can be used for application of pyrosequencing to arrays of the present disclosure are described, for example, in WO 12/058096 A1, U.S. 2005/0191698 A1, U.S. Pat. Nos. 7,595,883, and 7,244,559, each of which is incorporated herein by reference in its entirety.

Sequencing-by-ligation reactions can also be usefully carried out on a polymer sheet, substrate or other composition set forth herein including, for example, those described in Shendure et al. *Science* 309:1728-1732 (2005); U.S. Pat. Nos. 5,599,675; and 5,750,341, each of which is incorporated herein by reference in its entirety. Some embodiments can include sequencing-by-hybridization procedures as described, for example, in Bains et al., *Journal of Theoretical Biology* 135(3), 303-7 (1988); Drmanac et al., *Nature Biotechnology* 16, 54-58 (1998); Fodor et al., *Science* 251 (4995), 767-773 (1995); and WO 1989/10977, each of which is incorporated herein by reference in its entirety. In both sequencing-by-ligation and sequencing-by-hybridization procedures, nucleic acids that are present at sites of an array are subjected to repeated cycles of oligonucleotide delivery and detection. Fluidic systems for SBS methods as set forth herein or in references cited herein can be readily adapted for delivery of reagents for sequencing-by-ligation or sequencing-by-hybridization procedures. Typically, the oligonucleotides are fluorescently labeled and can be detected using fluorescence detectors similar to those described with regard to SBS procedures herein or in references cited herein.

Some embodiments that employ a composition set forth herein can utilize methods involving the real-time monitoring of DNA polymerase activity. For example, nucleotide incorporations can be detected through fluorescence resonance energy transfer (FRET) interactions between a fluorophore-bearing polymerase and γ-phosphate-labeled nucleotides, or with zeromode waveguides (ZMWs). Techniques and reagents for FRET-based sequencing are described, for example, in Levene et al. Science 299, 682-686 (2003); Lundquist et al. *Opt. Lett.* 33, 1026-1028 (2008); Korlach et al. *Proc. Natl. Acad. Sci.* USA 105, 1176-1181 (2008), the disclosures of which are incorporated herein by reference in its entirety.

Some SBS embodiments include detection of a proton released upon incorporation of a nucleotide into an extension product. For example, sequencing based on detection of released protons can use an electrical detector and associated techniques that are commercially available from Ion Torrent (Guilford, Conn., a Life Technologies subsidiary) or sequencing methods and systems described in U.S. 2009/0026082 A1; U.S. 2009/0127589 A1; US 2010/0137143 A1; or U.S. 2010/0282617 A1, each of which is incorporated herein by reference in its entirety. Nucleic acids can be attached to a polymer sheet, substrate or other composition set forth herein for detection in such a system or method.

Another useful application for a composition of the present disclosure is, for example, part of gene expression analysis. Gene expression can be detected or quantified using RNA sequencing techniques, such as those, referred to as digital RNA sequencing. RNA sequencing techniques can be carried out using sequencing methodologies known in the art such as those set forth above. Gene expression can also be detected or quantified using hybridization techniques carried out by direct hybridization to a polymer sheet, substrate or other composition set forth herein or using a multiplex assay, the products of which are detected on a polymer sheet, substrate or other composition set forth herein. A composition of the present disclosure, for example, having been produced by a method set forth herein, can also be used to determine genotypes for a genomic DNA sample from one or more individual. Exemplary methods for array-based expression and genotyping analysis that can be carried out on an array of the present disclosure are described in U.S. Pat. Nos. 7,582,420; 6,890,741; 6,913,884 or 6,355,431 or U.S. Pat. Pub. Nos. 2005/0053980 A1; 2009/0186349 A1 or U.S. 2005/0181440 A1, each of which is incorporated herein by reference in its entirety.

In some embodiments of the above-described method, which employ a polymer sheet, substrate or other composition set forth herein, only a single type of nucleotide is present in the flow cell during a single flow step. In such embodiments, the nucleotide can be selected from the group consisting of dATP, dCTP, dGTP, dTTP and analogs thereof. In other embodiments of the above-described method which employ a flow cell, a plurality different types of nucleotides are present in the flow cell during a single flow step. In such methods, the nucleotides can be selected from dATP, dCTP, dGTP, dTTP and analogs thereof.

Determination of the nucleotide or nucleotides incorporated during each flow step for one or more of the polynucleotides attached to the polymer coating on the surface of the substrate present in the flow cell is achieved by detecting a signal produced at or near the polynucleotide template. In some embodiments of the above-described methods, the detectable signal comprises and optical signal. In other embodiments, the detectable signal comprises a non-optical signal. In such embodiments, the non-optical signal comprises a change in pH at or near one or more of the polynucleotide templates.

In any of the embodiments of the sequencing methods described herein, the polymer coating may include the hydrogel or polymer sheets disclosed herein.

What is claimed is:

1. A process for preparing a patterned polymer sheet for sequencing applications, comprising:
   providing a substrate with a patterned surface, wherein said surface comprises a plurality of micro-scale or nano-scale patterned wells;
   depositing a polymer composition onto the patterned surface to form a first polymer layer, wherein the polymer composition fills the micro-scale or nano-scale patterned wells;
   dehydrating the first polymer layer to form a dehydrated first polymer sheet; and
   separating the dehydrated first polymer sheet from the patterned surface, wherein the polymer composition is filled in the micro-scale or nano-scale patterned wells of the patterned surface is isolated in micro-scale or nano-scale patterned wells after separation of the dehydrated first polymer sheet.

2. The process of claim 1, wherein the polymer composition comprises a hydrogel.

3. The process of claim 1, wherein the polymer composition comprises a first plurality of functional groups selected from the group consisting of vinyl, acryloyl, alkenyl, alkynyl, $C_{8-14}$ cycloalkenes, 8 to 14 membered heterocycloalkenes, $C_{8-14}$ cycloalkynes, 8 to 14 membered heterocycloalkynes, nitrene, aldehyde, hydrazinyl, glycidyl ether, epoxy, amino, carbene, azido, carboxyl, glycidyl, halo, tetrazinyl, isocyanate and maleimide, and optionally substituted variants and combinations thereof.

4. The process of claim 3, wherein the first plurality of functional groups are selected from the group consisting of azido, alkynyl, amino, carboxyl, epoxy, glycidyl, halo, and tetrazinyl, and optionally substituted variants and combinations thereof.

5. The process of claim 4, wherein the first plurality of functional groups comprise azido.

6. The process of claim 1, wherein the polymer composition comprises poly (N-(5-azidoacetamidylpentyl) acrylamide-co-acrylamide) (PAZAM).

7. The process of claim 6, further comprising grafting oligonucleotides onto the polymer composition isolated in the micro-scale or nano-scale patterned wells of the patterned surface.

8. The process of claim 1, comprising incubating the polymer composition after the depositing of the polymer composition onto the patterned surface.

9. The process of claim 1, wherein the polymer composition is formed from an in situ polymerization reaction from the group consisting of a monomer composition, a pre-polymer composition, or a polymer precursor composition.

10. The process of claim 3, comprising grafting oligonucleotides onto the polymer composition isolated in the micro-scale or nano-scale patterned wells of the patterned surface.

11. The process of claim 10, wherein the grafting comprising reacting functionalized oligonucleotides with a first plurality of functional groups of the polymer composition.

12. The process of claim 7, wherein the grafting comprising reacting functionalized oligonucleotides with a first plurality of functional groups of the polymer composition.

13. The process of claim 1, wherein the polymer composition comprises a hydrogel, wherein the process further comprises rehydrating the polymer composition prior to reacting the composition with oligonucleotides.

14. The process of claim 13, wherein the hydrogel comprises alkyne crosslinkers.

15. The process of claim 1, wherein the plurality of micro-scale or nano-scale patterned wells are nano-scale wells.

16. The process of claim 15, wherein the plurality of nano-scale wells comprise an average well diameter or height of less than about 500 nm.

17. The process of claim 1, wherein the substrate comprises a silica material or a plastic material.

18. The process of claim 17, wherein the silica material comprises silicon, silicon dioxide, silicon nitride, silicone hydrides.

19. The process of claim 17, wherein the plastic material comprises polyethylene, polystyrene, poly (vinyl chloride), polypropylene, nylons, polyesters, polycarbonates and poly (methyl methacrylate).

* * * * *

SEQUENCE LISTING

```
<160> NUMBER OF SEQ ID NOS: 4

<210> SEQ ID NO 1
<211> LENGTH: 29
<212> TYPE: DNA
<213> ORGANISM: Artificial Sequence
<220> FEATURE:
<223> OTHER INFORMATION: Paired end primer sequence

<400> SEQUENCE: 1
aatgatacgg cgaccaccga gauctacac                                          29

<210> SEQ ID NO 2
<211> LENGTH: 24
<212> TYPE: DNA
<213> ORGANISM: Artificial Sequence
<220> FEATURE:
<223> OTHER INFORMATION: Paired end primer sequence

<400> SEQUENCE: 2
caagcagaag acggcatacg agat                                               24

<210> SEQ ID NO 3
<211> LENGTH: 20
<212> TYPE: DNA
<213> ORGANISM: Artificial Sequence
<220> FEATURE:
<223> OTHER INFORMATION: Single read primer sequence

<400> SEQUENCE: 3
aatgatacgg cgaccaccga                                                    20

<210> SEQ ID NO 4
<211> LENGTH: 21
<212> TYPE: DNA
<213> ORGANISM: Artificial Sequence
<220> FEATURE:
<223> OTHER INFORMATION: Single read primer sequence

<400> SEQUENCE: 4
caagcagaag acggcatacg a                                                  21
```